US009009023B2

(12) United States Patent
Fuji et al.

(10) Patent No.: US 9,009,023 B2
(45) Date of Patent: Apr. 14, 2015

(54) COMPUTER-READABLE MEDIUM HAVING SENTENCE DIVIDING PROGRAM STORED THEREON, SENTENCE DIVIDING APPARATUS, AND SENTENCE DIVIDING METHOD

(75) Inventors: Masaru Fuji, Kawasaki (JP); Tomoki Nagase, Kawasaki (JP); Seiji Okura, Kawasaki (JP); Akira Ushioda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1665 days.

(21) Appl. No.: 12/056,432

(22) Filed: Mar. 27, 2008

(65) Prior Publication Data

US 2009/0006080 A1 Jan. 1, 2009

(30) Foreign Application Priority Data

Jun. 29, 2007 (JP) ................................ 2007-173440

(51) Int. Cl.
*G06F 17/20* (2006.01)
*G06F 17/27* (2006.01)
*G06F 17/28* (2006.01)

(52) U.S. Cl.
CPC ........ *G06F 17/2863* (2013.01); *G06F 17/2765* (2013.01)

(58) Field of Classification Search
CPC . G06F 17/20; G06F 17/2127; G06F 17/2705; G06F 17/2755; G06F 17/277; G06F 17/2775; G06F 17/2715; G06F 17/274
USPC ................ 704/1, 2, 3, 8, 9, 10; 715/256–264
See application file for complete search history.

(56) References Cited

U.S. PATENT DOCUMENTS

| | | | | | |
|---|---|---|---|---|---|
| 5,170,349 | A | * | 12/1992 | Yagisawa et al. | 704/9 |
| 5,619,410 | A | * | 4/1997 | Emori et al. | 704/7 |
| 5,826,219 | A | * | 10/1998 | Kutsumi | 704/4 |
| 6,035,268 | A | * | 3/2000 | Carus et al. | 704/9 |
| 6,052,657 | A | * | 4/2000 | Yamron et al. | 704/9 |
| 6,289,302 | B1 | * | 9/2001 | Kuo | 704/2 |
| 6,295,529 | B1 | * | 9/2001 | Corston-Oliver et al. | 707/715 |
| 6,678,409 | B1 | * | 1/2004 | Wu et al. | 382/177 |
| 6,714,939 | B2 | * | 3/2004 | Saldanha et al. | 1/1 |
| 6,810,375 | B1 | * | 10/2004 | Ejerhed | 704/9 |
| 7,113,897 | B2 | * | 9/2006 | Shimizu et al. | 703/2 |

(Continued)

FOREIGN PATENT DOCUMENTS

| | | |
|---|---|---|
| JP | 6-295308 | 10/1994 |
| JP | 07-105214 | 4/1995 |
| JP | 10-49535 | 2/1998 |

OTHER PUBLICATIONS

Japanese Office Action for Application No. 2007-173440 issued Sep. 4, 2012.

*Primary Examiner* — Paras D Shah
(74) *Attorney, Agent, or Firm* — Staas & Halsey LLP

(57) ABSTRACT

A typical sentence having a specific typical characteristic in the sentence is divided. A division target typical sentence is divided on the basis of a small clause definition. The sentence is divided where positions suitable for dividing the typical sentence based on the structure are expressed by a user. A small clause string including small clauses that serve as independent sentences is created after the division. The small clause string is compared to the structure patterns, and a structure pattern that is determined to match the small clause string is selected as a result of the typical sentence division.

4 Claims, 29 Drawing Sheets

(56) References Cited

U.S. PATENT DOCUMENTS

| | | | | |
|---|---|---|---|---|
| 7,233,891 | B2* | 6/2007 | Bond et al. | 704/9 |
| 7,475,006 | B2* | 1/2009 | Weise | 704/9 |
| 7,493,251 | B2* | 2/2009 | Gao et al. | 704/8 |
| 7,562,008 | B2* | 7/2009 | Chan | 704/9 |
| 2001/0009009 | A1* | 7/2001 | Iizuka | 707/539 |
| 2002/0046018 | A1* | 4/2002 | Marcu et al. | 704/9 |
| 2004/0243394 | A1* | 12/2004 | Kitamura | 704/9 |
| 2005/0071148 | A1* | 3/2005 | Huang et al. | 704/4 |
| 2005/0261891 | A1* | 11/2005 | Chan et al. | 704/9 |
| 2007/0016398 | A1* | 1/2007 | Buchholz | 704/4 |
| 2008/0201130 | A1* | 8/2008 | Peters et al. | 704/9 |
| 2008/0208569 | A1* | 8/2008 | Simpson et al. | 704/9 |

* cited by examiner

FIG. 3

<TYPICAL SMALL CLAUSE>

(INFLECTIONAL/CONTINUATIVE): * + INFLECTIONAL TERMINATION OF CONTINUATIVE FORM + COMMA

<DEPENDENCY TARGET CANDIDATE SMALL CLAUSE>

(CONTINUATIVE): * + VERB CONTINUATIVE FORM
(CONCLUSIVE): * + VERB CONCLUSIVE FORM + PERIOD (NOTE: "*" MEANS EXTENDING SMALL CLAUSE TO PHRASE IMMEDIATELY BEFORE NEXT SMALL CLAUSE ON THE LEFT.)

FIG. 4

<STRUCTURE PATTERN DEFINITION>

P1: (INFLECTIONAL/CONTINUATIVE) + (INFLECTIONAL/CONTINUATIVE) + (CONTINUATIVE) + (CONCLUSIVE)
→
[PREPARATION 1] + [PREPARATION 2] + [PREPARATION 3] + [PROCESSING]

P2: (INFLECTIONAL/CONTINUATIVE) + (INFLECTIONAL/CONTINUATIVE) + (INFLECTIONAL/CONTINUATIVE) + (CONTINUATIVE) + (CONCLUSIVE)
→
[PREPARATION 1] + [PREPARATION 2] + [PREPARATION 3] + [PREPARATION 4] + [PROCESSING]

P3: (INFLECTIONAL/CONTINUATIVE) + (INFLECTIONAL/CONTINUATIVE) + ((CONTINUATIVE) + (CONCLUSIVE))
→
[PREPARATION 1] + [PREPARATION 2] + [PROCESSING]

FIG. 5

| |
|---|
| SHOUGA-WO SURIOROSHI, NIKU-WO TABEYASUI OOKISANI KIRI, NEGI-WO KIZANDE YOKU MAZEAWASERU. |

FIG. 6

| |
|---|
| SHOUGA-WO |
| SURIOROSHI, |
| NIKU-WO |
| TABEYASUI |
| OOKISANI |
| KIRI, |
| NEGI-WO |
| KIZANDE |
| YOKU |
| MAZEAWASERU. |

FIG. 7

| PHRASE | SMALL CLAUSE | SMALL CLAUSE LABEL |
|---|---|---|
| SHOUGA-WO<br>SURIOROSHI, | * +<br>INFLECTIONAL TERMINATION OF CONTINUATIVE FORM<br>+ COMMA | (INFLECTIONAL/ CONTINUATIVE) |
| NIKU-WO<br>TABEYASUI<br>OOKISANI<br>KIRI, | * +<br>* +<br>* +<br>INFLECTIONAL TERMINATION OF CONTINUATIVE FORM<br>+ COMMA | (INFLECTIONAL/ CONTINUATIVE) |
| NEGI-WO<br>KIZANDE | * +<br>VERB CONTINUATIVE FORM | (CONTINUATIVE) |
| YOKU<br>MAZEAWASERU. | * +<br>VERB CONCLUSIVE FORM<br>+ PERIOD | (CONCLUSIVE) |

FIG. 8

| SMALL CLAUSE | SMALL CLAUSE LABEL |
|---|---|
| SHOUGA-WO SURIOROSHI, | (INFLECTIONAL/ CONTINUATIVE) |
| NIKU-WO TABEYASUI OOKISANI KIRI, | (INFLECTIONAL/ CONTINUATIVE) |
| NEGI-WO KIZANDE | (CONTINUATIVE) |
| YOKU MAZEAWASERU. | (CONCLUSIVE) |

FIG. 9

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE | [PREPARATION 3] |
| YOKU MAZEAWASERU. | [PROCESSING] |

FIG. 12

NUMBER OF PARALLEL ELEMENTS * FOLLOWING MATCHING POINTS

<MATCH OF PARTICLE ELEMENTS>

(a)+3: CASE WHERE ALL OF PARALLEL ELEMENTS INCLUDE "PARTICLE OF "HA""
(b)+3: CASE WHERE ALL OF PARALLEL ELEMENTS INCLUDE "PARTICLE OF "WO""
(c)+2: CASE WHERE ALL OF PARALLEL ELEMENTS INCLUDE "PARTICLE OF "NI""

<MATCH OF VERB AT THE RIGHT END>

(d)+5: CASE WHERE ALL OF VERB AT THE RIGHT END ARE IDENTICAL VERB
(e)+3: CASE WHERE ALL OF VERB AT THE RIGHT END ARE IDENTICAL VOICE

<MATCH OF NUMBERS OF PHRASES>

(f)+2: CASE WHERE ALL OF PARALLEL ELEMENTS INCLUDE IDENTICAL NUMBER OF PHRASES

FIG. 13

SENTENCE 1

SHOUGA-WO SURIOROSHI, NIKU-WO TABEYASUI OOKISANI KIRI, NEGI-WO KIZANDE YOKU MAZEAWASERU.

SENTENCE 2

SHOUGA-WO SURIOROSHI, NIKU-WO TABEYASUI OOKISANI KIRI, NESSHITA NABE-NI TOUNYUSHITE ITAMERU.

FIG. 14

SENTENCE 1

| |
|---|
| SHOUGA-WO |
| SURIOROSHI, |
| NIKU-WO |
| TABEYASUI |
| OOKISANI |
| KIRI, |
| NEGI-WO |
| KIZANDE |
| YOKU |
| MAZEAWASERU. |

SENTENCE 2

| |
|---|
| SHOUGA-WO |
| SURIOROSHI, |
| NIKU-WO |
| TABEYASUI |
| OOKISANI |
| KIRI, |
| NESSHITA |
| NABE-NI |
| TOUNYUSHITE |
| ITAMERU. |

FIG. 15

SENTENCE 1

| PHRASE | SMALL CLAUSE | SMALL CLAUSE LABEL |
|---|---|---|
| SHOUGA-WO<br>SURIOROSHI, | INFLECTIONAL TERMINATION OF CONTINUATIVE FORM + COMMA | (INFLECTIONAL/CONTINUATIVE) |
| NIKU-WO<br>TABEYASUI<br>OOKISANI<br>KIRI, | *+<br>*+<br>*+<br>INFLECTIONAL TERMINATION OF CONTINUATIVE FORM + COMMA | (INFLECTIONAL/CONTINUATIVE) |
| NEGI-WO<br>KIZANDE | *+<br>VERB CONTINUATIVE FORM | (CONTINUATIVE) |
| YOKU<br>MAZEAWASERU. | *+<br>VERB CONCLUSIVE FORM + PERIOD | (CONCLUSIVE) |

SENTENCE 2

| PHRASE | SMALL CLAUSE | SMALL CLAUSE LABEL |
|---|---|---|
| SHOUGA-WO<br>SURIOROSHI, | *+<br>INFLECTIONAL TERMINATION OF CONTINUATIVE FORM + COMMA | (INFLECTIONAL/CONTINUATIVE) |
| NIKU-WO<br>TABEYASUI<br>OOKISANI<br>KIRI, | *+<br>*+<br>*+<br>INFLECTIONAL TERMINATION OF CONTINUATIVE FORM + COMMA | (INFLECTIONAL/CONTINUATIVE) |
| NESSHITA<br>NABE-NI<br>TOUNYUSHITE | *+<br>*+<br>VERB CONTINUATIVE FORM | (CONTINUATIVE) |
| ITAMERU. | VERB CONCLUSIVE FORM + PERIOD | (CONCLUSIVE) |

FIG. 16

SENTENCE 1

| SMALL CLAUSE | SMALL CLAUSE LABEL |
|---|---|
| SHOUGA-WO SURIOROSHI, | (INFLECTIONAL/ CONTINUATIVE) |
| NIKU-WO TABEYASUI OOKISANI KIRI, | (INFLECTIONAL/ CONTINUATIVE) |
| NEGI-WO KIZANDE | (CONTINUATIVE) |
| YOKU MAZEAWASERU. | (CONCLUSIVE) |

SENTENCE 2

| SMALL CLAUSE | SMALL CLAUSE LABEL |
|---|---|
| SHOUGA-WO SURIOROSHI, | (INFLECTIONAL/ CONTINUATIVE) |
| NIKU-WO TABEYASUI OOKISANI KIRI, | (INFLECTIONAL/ CONTINUATIVE) |
| NESSHITA NABE-NI TOUNYUSHITE | (CONTINUATIVE) |
| ITAMERU. | (CONCLUSIVE) |

FIG. 17

SENTENCE 1–P1

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE | [PREPARATION 3] |
| YOKU MAZEAWASERU. | [PROCESSING] |

SENTENCE 2–P1

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NESSHITA NABE-NI TOUNYUSHITE | [PREPARATION 3] |
| ITAMERU. | [PROCESSING] |

SENTENCE 1–P3

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE YOKU MAZEAWASERU. | [PROCESSING] |

SENTENCE 2–P3

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NESSHITA NABE-NI TOUNYUSHITE ITAMERU. | [PROCESSING] |

FIG. 18

SENTENCE 1−P1
SCORE: $3*((b)+(e))=3*(3+3)=18$

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE | [PREPARATION 3] |
| YOKU MAZEAWASERU. | [PROCESSING] |

SENTENCE 2−P1
SCORE: $3*(e)=3*3=9$

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NESSHITA NABE-NI TOUNYUSHITE | [PREPARATION 3] |
| ITAMERU. | [PROCESSING] |

SENTENCE 1−P3
SCORE: $2*((b)+(e))=2*(3+3)=12$

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE YOKU MAZEAWASERU. | [PROCESSING] |

SENTENCE 2−P3
SCORE: $2*((b)+(e))=2*(3+3)=12$

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NESSHITA NABE-NI TOUNYUSHITE ITAMERU. | [PROCESSING] |

FIG. 19

OUTPUT RESULT OF SENTENCE 1

FIRST CANDIDATE (SCORE 18)

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE | [PREPARATION 3] |
| YOKU MAZEAWASERU. | [PROCESSING] |

SECOND CANDIDATE (SCORE 12)

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE YOKU MAZEAWASERU. | [PROCESSING] |

OUTPUT RESULT OF SENTENCE 2

FIRST CANDIDATE (SCORE 12)

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NESSHITA NABE-NI TOUNYUSHITE ITAMERU. | [PROCESSING] |

SECOND CANDIDATE (SCORE 9)

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NESSHITA NABE-NI TOUNYUSHITE | [PREPARATION 3] |
| ITAMERU. | [PROCESSING] |

FIG. 22

<STRUCTURE DEFINITION>

P1: (INFLECTIONAL/CONTINUATIVE) + (INFLECTIONAL/CONTINUATIVE) + (CONTINUATIVE) + (CONCLUSIVE)
→
[PREPARATION 1] + [PREPARATION 2] + [PREPARATION 3] + [PROCESSING]

P2: (INFLECTIONAL/CONTINUATIVE) + (INFLECTIONAL/CONTINUATIVE) + (INFLECTIONAL/CONTINUATIVE) + (CONTINUATIVE) + (CONCLUSIVE)
→
[PREPARATION 1] + [PREPARATION 2] + [PREPARATION 3] + [PREPARATION 4] + [PROCESSING]

P3: (INFLECTIONAL/CONTINUATIVE) + (INFLECTIONAL/CONTINUATIVE) + (CONCLUSIVE)
→
[PREPARATION 1] + [PREPARATION 2] + [PROCESSING]

COMPARE SMALL CLAUSES EXCLUDING TRACE SMALL CLAUSES WITH ORDER OF SMALL CLAUSES WRITTEN IN PATTERN, PATTERN HAVING CLAUSES EXACTLY MATCH IS APPLICABLE

FIG. 23

| SMALL CLAUSE | SMALL CLAUSE LABEL | SMALL CLAUSE PROPERTY | DEPENDENCY TARGET SMALL CLAUSE/ DEPENDENCY TYPE |
|---|---|---|---|
| SHOUGA-WO SURIOROSHI, | (INFLECTIONAL/ CONTINUATIVE) | DECLINABLE WORD | (INFLECTIONAL/CONTINUATIVE)/PARALLEL, (CONCLUSIVE)/MODIFICATION |
| NIKU-WO TABEYASUI OOKISANI KIRI, | (INFLECTIONAL/ CONTINUATIVE) | DECLINABLE WORD | (CONTINUATIVE)/PARALLEL, (CONCLUSIVE)/MODIFICATION |
| NEGI-WO KIZANDE | (CONTINUATIVE) | DECLINABLE WORD | (CONCLUSIVE)/MODIFICATION, (INFLECTIONAL/CONTINUATIVE)/MODIFICATION |
| YOKU MAZEAWASERU. | (CONCLUSIVE) | DECLINABLE WORD | NONE |

FIG. 27

SKELETAL SMALL CLAUSE 1-P3

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE YOKU MAZEAWASERU. | [PROCESSING] |

SKELETAL SMALL CLAUSE 2-P1

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE | [PREPARATION 3] |
| YOKU MAZEAWASERU. | [PROCESSING] |

FIG. 28

SKELETAL SMALL CLAUSE 1−P3
SCORE: 2∗((b)+(e))=2∗(3+3)=12

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE YOKU MAZEAWASERU. | [PROCESSING] |

SKELETAL SMALL CLAUSE 2−P1
SCORE: 3∗((b)+(e))=3∗(3+3)=18

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE | [PREPARATION 3] |
| YOKU MAZEAWASERU. | [PROCESSING] |

FIG. 29

OUTPUT RESULT

FIRST CANDIDATE (SCORE 18)

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE | [PREPARATION 3] |
| YOKU MAZEAWASERU. | [PROCESSING] |

SECOND CANDIDATE (SCORE 12)

| STRUCTURAL ELEMENT | STRUCTURE LABEL |
|---|---|
| SHOUGA-WO SURIOROSHI, | [PREPARATION 1] |
| NIKU-WO TABEYASUI OOKISANI KIRI, | [PREPARATION 2] |
| NEGI-WO KIZANDE YOKU MAZEAWASERU. | [PROCESSING] |

COMPUTER-READABLE MEDIUM HAVING SENTENCE DIVIDING PROGRAM STORED THEREON, SENTENCE DIVIDING APPARATUS, AND SENTENCE DIVIDING METHOD

CROSS-REFERENCE TO RELATED APPLICATIONS

This application is based upon and claims the benefit of priority of the prior Japanese Patent Application No. 2007-173440, filed on Jun. 29, 2007, the entire contents of which are incorporated herein by reference.

BACKGROUND

1. Field of the Invention

The present invention relates to sentence dividing programs, sentence dividing apparatuses, and sentence dividing methods.

2. Description of the Related Art

In the related art, when a very typical sentence is divided, a very appropriate result may not be obtained, undesirably, as a whole sentence. More specifically, for example, since "a system that divides a sentence according to a superficial clue" only divides a sentence according to a partial superficial clue, such a system cannot cope with ambiguity of a sentence structure. As a result, the system cannot obtain a very appropriate division result as a whole sentence. In addition, for example, since "a system that divides a sentence according to grammar rules" only executes sentence structure analysis according to the grammar rules to divide a sentence, such a system cannot divide the sentence according to a typical characteristic. As a result, the system cannot obtain a very appropriate division result as a whole sentence. Additionally, for example, since "a system that performs translation using typical patterns" only previously creates typical patterns whose noun phrase is treated as a variable part, a hit rate of an input sentence matching a typical pattern is low in the first place.

In addition, as described below, in addition to the foregoing disadvantages, there is a disadvantage that very typical sentences cannot be divided simply and flexibly in the above-described related art. More specifically, for example, in "a system that divides a sentence according to grammar rules", since a person who can create the grammar rules is limited to a developer familiar with the system, the grammar rules are built in the system and provided. In such a case, since users of the system cannot modify the grammar rules according to a typical characteristic and also cannot create grammar rules regarding new types of sentences not supported by the system, the very typical sentences cannot be divided simply and flexibly.

Additionally, as described below, there is a disadvantage that an optimum candidate cannot be selected when a plurality of division candidates are obtained as a result in the above-described related art as well as the foregoing disadvantages. More specifically, for example, when a sentence is compared with typical patterns in "a system that performs translation using the typical patterns", there are cases where a plurality of typical patterns are retrieved. In such a case, the system cannot select an optimum typical pattern.

Furthermore, as described below, there is a disadvantage that long sentences cannot be handled in the above-described related art as well as the foregoing disadvantages. More specifically, when general sentence structure analyzing systems related to, for example, "a system that divides a sentence according to grammar rules" employ a method for finding dividing positions after executing sentence structure analysis of a whole sentence, such systems fail in the sentence structure analysis if the sentence is long. As a result, the systems cannot divide the sentence.

SUMMARY

According to one aspect of an embodiment, a sentence dividing program, stored on a computer-readable medium, for allowing a computer to execute a sentence dividing method for dividing a typical sentence having a specific typical characteristic in the sentence includes: a small clause string creating operation of dividing, under a circumstance where positions suitable for dividing the typical sentence based on the structure are expressed by a user using property information of the sentence and are previously stored as a small clause definition in a first storage unit, a division target typical sentence on the basis of the small clause definition stored in the first storage unit, and of creating a small clause string including small clauses that serve as independent sentences after the division; a comparing operation of comparing, under a circumstance where structures suitable for the typical sentence are expressed by the user as combinations with each small clause definition and are previously stored as structure patterns in a second storage unit, the small clause string created at the small clause string creating operation with the structure patterns stored in the second storage unit; and a selecting operation of selecting, as a division result of the typical sentence, a structure pattern that is determined to match the small clause string at the comparing operation.

The above-described embodiments of the present invention are intended as examples, and all embodiments of the present invention are not limited to including the features described above.

BRIEF DESCRIPTION OF THE DRAWINGS

FIG. 3 is a diagram for explaining a small clause definition storage unit (i.e., an example of a small clause definition) in an embodiment 1;

FIG. 4 is a diagram for explaining a typical pattern storage unit (i.e., an example of a structure pattern) in an embodiment 1.

FIG. 5 is a diagram for explaining an input sentence accepting unit (i.e., an input sentence) in an embodiment 1;

FIG. 6 is a diagram for explaining a phrase combining unit (i.e., a phrase string of an input sentence) in an embodiment 1;

FIG. 7 is a diagram for explaining a small clause combining unit (i.e., application of a small clause definition) in an embodiment 1;

FIG. 8 is a diagram for explaining a small clause combining unit (i.e., an application result of a small clause definition) in an embodiment 1;

FIG. 9 is a diagram for explaining a typical pattern applying unit (i.e., an application result of a structure pattern) in an embodiment 1;

FIG. 12 is a diagram for explaining a score table storage unit (i.e., an example of scoring) in an embodiment 2.

FIG. 13 is a diagram for explaining an input sentence accepting unit (i.e., input sentences) in an embodiment 2;

FIG. 14 is a diagram for explaining a phrase combining unit (i.e., phrase strings of input sentences) in an embodiment 2;

FIG. 15 is a diagram for explaining a small clause combining unit (i.e., application of a small clause definition) in an embodiment 2;

FIG. 16 is a diagram for explaining a small clause combining unit (i.e., application results of a small clause definition) in an embodiment 2;

FIG. 17 is a diagram for explaining a multiple typical pattern applying unit (i.e., application results of structure patterns) in an embodiment 2;

FIG. 18 is a diagram for explaining a candidate group sorting unit (i.e., application results of scoring) in an embodiment 2;

FIG. 19 is a diagram for explaining a candidate group sorting unit (i.e., sorted structure pattern output results) in an embodiment 2;

FIG. 22 is a diagram for explaining a typical pattern storage unit (i.e., an example of applying a pattern to a skeletal small clause) in an embodiment 3;

FIG. 23 is a diagram for explaining a small clause dependency analyzing unit (i.e., utilization of small clauses serving as a unit of analysis) in an embodiment 3;

FIG. 27 is a diagram for explaining a multiple typical pattern applying unit (i.e., results of applying structure patterns to skeletal small clause strings) in an embodiment 3;

FIG. 28 is a diagram for explaining a candidate group sorting unit (i.e., scoring application results) in an embodiment 3;

FIG. 29 is a diagram for explaining a candidate group sorting unit in an embodiment 3;

DETAILED DESCRIPTION OF THE PREFERRED EMBODIMENTS

Figure 1:
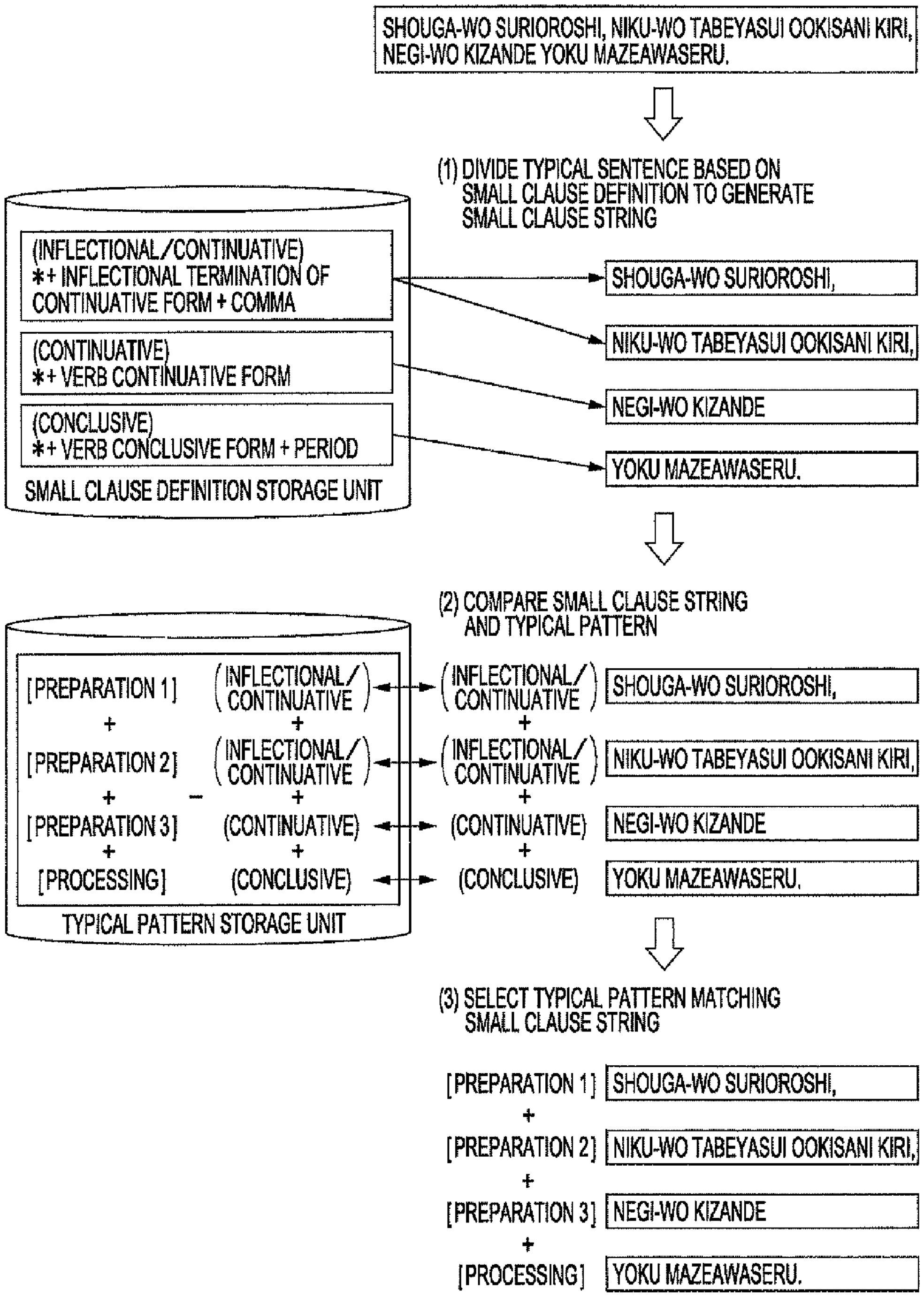
FIG. 1 is a diagram for explaining an overview and a feature of a sentence dividing apparatus according to an embodiment 1.

Reference may now be made in detail to embodiments of the present invention, examples of which are illustrated in the accompanying drawings, wherein like reference numerals refer to like elements throughout.

Accordingly, the present invention is made to overcome the above-described disadvantages in the related art. It is an object of the present invention to provide a sentence dividing program, a sentence dividing apparatus, and a sentence dividing method that are capable of obtaining a very appropriate division result as a whole sentence when dividing a very typical sentence.

In addition to the foregoing object, it is another object of the present invention to provide a sentence dividing program, a sentence dividing apparatus, and a sentence dividing method that are capable of dividing a very typical sentence simply and flexibly.

In addition to the foregoing objects, it is still another object of the present invention to provide a sentence dividing program, a sentence dividing apparatus, and a sentence dividing method that are capable of selecting an optimum candidate when a plurality of division candidates are obtained as a result.

In addition to the foregoing objects, it is a further object of the present invention to provide a sentence dividing program, a sentence dividing apparatus, and a sentence dividing method that are capable of handling a long sentence.

Sentence dividing programs, sentence dividing apparatuses, and sentence dividing methods according to embodiments of the present invention will be described in detail below with reference to the accompanying drawings. As described below, description will be given sequentially regarding major terms used in the embodiments given below, an overview and a feature of a sentence dividing apparatus according to an embodiment 1, a configuration of the sentence dividing apparatus according to the embodiment 1 and a process performed thereby, and advantages of the embodiment 1. Thereafter, other embodiments will be described.

Embodiment 1

Description of Terms

Firstly, major terms used in embodiments given below will be described. A "sentence" used in the embodiments given below means one or more sentences constituted by morphemes (minimum linguistic units having meanings). For example, the "sentence" may be a sentence of "Shouga-wo surioroshi, niku-wo tabeyasui ookisani kiri, yoku mazeawaseru. (Grate ginger, cut meat into easy-to-eat size, and mix up well.)".

Meanwhile, "sentences" are generally created in an unrestrictive "structure" by writers or speakers of the "sentences". In addition to such "sentences" in the unrestrictive "structure", there are "typical sentences" having "typical characteristics".

The "typical characteristics" used herein are characteristics of the "structures" of the "sentences" that are decided limitedly (so that the structures are categorized into types) according to fields to which the "sentences" belong. More specifically, for example, suppose that a "sentence" of "Shouga-wo surioroshi, niku-wo tabeyasui ookisani kiri, yoku mazeawaseru. (Grate ginger, cut meat into easy-to-eat size, and mix up well.)" is a "typical sentence" used in a cooking field. Additionally, suppose that a "typical characteristic" of the "typical sentence" used in the cooking field includes an expression that a comma follows an inflectional termination of a continuative form of a verb (e.g., "~shi,"), which indicates a preparation step of cooking, and an expression that a period follows a conclusive form of a verb (e.g., "~suru."), which indicates processing performed on the ingredients prepared at preparation steps. In such a case, "Shouga-wo surioroshi," and "niku-wo tabeyasui ookisani kiri," are cooking preparation steps, while "yoku mazeawaseru." is processing performed on the grated ginger and the meat that has been cut into easy-to-eat size.

However, the "typical characteristic" does not apply to all kinds of "sentences". For example, in a "sentence" of "Denwa-wo shi, yushoku-wo tabete, neru. (I make a call, have supper, and go to bed.)", "Denwa-wo shi,", and "yushoku-wo tabete," are expressions that a comma follows inflectional termination of a continuative form of a verb. However, the expressions do not represent cooking preparation steps. Similarly, although "neru." is an expression that a period follows a conclusive form of a verb, the expression does not represent processing performed on the ingredients having been prepared at the preparation steps. That is, it is considered that the "typical characteristic" is peculiar to "sentences" depending on fields to which the "sentences" belong.

As described above, "typical sentences" are different from general "sentences" and have specific "typical characteristics" in "structures" thereof. Thus, when dividing such a very "typical" sentence, there are expectations that a very appropriate division result can be obtained for a whole sentence. To meet such expectations, sentence dividing apparatuses according to embodiments of the present invention sets obtainment of a very appropriate division result for a whole sentence when dividing a very "typical" "sentence" as one object thereof.

In the following embodiments, a case where Japanese "sentences" are employed as the "sentences" and sentence dividing apparatuses according to the embodiments of the present invention divide the Japanese "sentences" will be described. However, the present invention is not limited to this particular example, and can be similarly applied to cases where "sentences" in a language other than Japanese are employed as the "sentences" and the sentence dividing apparatuses according to the embodiments of the present invention divide the "sentences" in the language other than Japanese. In addition, in the embodiments given below, although a case where one sentence is employed as the "sentence" and the sentence dividing apparatuses according to the embodiments of the present invention divide the one sentence will be described, the present invention is not limited to this particular example. The present invention can be similarly applied to cases where a plurality of sentences are employed as the "sentences" and the sentence dividing apparatuses according to the embodiments of the present invention divide the plurality of sentences.

Overview and Feature of Sentence Dividing Apparatus According to Embodiment 1

An overview and a feature of a sentence dividing apparatus according to an embodiment 1 will be described next using FIG. 1. FIG. 1 is a diagram for explaining an overview and a feature of a sentence dividing apparatus according to an embodiment 1.

As described above, the sentence dividing apparatus according to the embodiment 1 generally divides a typical sentence having a specific typical characteristic in a structure of the sentence, and has a main feature to obtain a very appropriate division result for a whole sentence.

To briefly describe this main feature, as shown in FIG. 1, the sentence dividing apparatus according to the embodiment 1 previously stores small clause definitions in a small clause definition storage unit. Here, in the small clause definitions, positions suitable for dividing the typical sentence based on the structure of the typical sentence are expressed by users using property information of the sentence. To give a description for an example of FIG. 1, the small clause definition storage unit stores small clause definitions suitable for dividing typical sentences of a cooking field. The storage unit stores definitions of "*+inflectional termination of continuative form+comma", "*+verb continuative form", and "*+verb conclusive form+period". In the example of FIG. 1, the small clause definitions are defined by expressions at the right end of a phrase string including morphemes.

The definition of "*+inflectional termination of continuative form+comma" means that phrases from an expression that a comma follows inflectional termination of a continuative form of a verb (e.g., "~shi,") set at the right end to a phrase immediately before the next small clause on the left are connected as a small clause. In addition, the definition of "*+verb continuative form" means that phrases from an expression of a continuative form of a verb (e.g., "~shite") set at the right end to a phrase immediately before the next small clause on the left are connected as a small clause. Additionally, the definition of "*+verb conclusive form+period" means that phrases from an expression that a period follows a conclusive termination of a verb (e.g., "~suru.") set at the right end to a phrase immediately before the next small clause on the left are connected as a small clause. Meanwhile, the expressions (inflectional/continuative), (continuative), and (conclusive) are small clause labels attached to each of the small clause definitions.

In addition, as shown in FIG. 1, the sentence dividing apparatus according to the embodiment 1 previously stores typical patterns (corresponding to "structure patterns" written in the attached claims) in a typical pattern storage unit. Here, in the typical patterns, structures suitable as structures of a typical sentence are expressed by users as combinations with each small clause definition. To give a description for an example of FIG. 1, the typical pattern storage unit stores structure patterns of typical sentences employed in a cooking field. The storage unit stores a typical pattern of "(inflectional/continuative)+(inflectional/continuative)+(continuative)+(conclusive)→[preparation 1]+[preparation 2]+[preparation 3]+[processing]". In the example of FIG. 1, the typical patterns are expressed as combinations of small clause labels.

[Preparation 1] to [preparation 3] represent corresponding cooking preparation steps, while [processing] represents processing to be performed on the ingredients having been prepared at the preparation steps. That is, the typical pattern of "(inflectional/continuative)+(inflectional/continuative)+(continuative)+(conclusive)→[preparation 1]+[preparation 2]+[preparation 3]+[processing]" means that, if the small clause labels of a small clause string of a typical sentence are "(inflectional/continuative)+(inflectional/continuative)+(continuative)+(conclusive)", the typical sentence has a structure of sequentially including three cooking preparation steps and processing to be performed on the ingredients having been prepared at the preparation steps at last. For convenience of explanation, although a case where the typical pattern storage unit stores only one typical pattern is described in the example of FIG. 1, the present invention is not limited to this particular example. The typical pattern storage unit may store a plurality of typical patterns.

With such a configuration, the sentence dividing apparatus according to the embodiment 1 first divides a division target typical sentence on the basis of the small clause definitions stored in the small clause definition storage unit, and creates a small clause string including small clauses that serve as independent sentences after the division (see, FIG. 1 (1)).

For example, the sentence dividing apparatus according to the embodiment 1 divides a division target typical sentence of "Shouga-wo surioroshi, niku-wo tabeyasui ookisani kiri, negi-wo kizande yoku mazeawaseru. (Grate ginger, cut meat into easy-to-eat size, chop up welsh onion and mix up well.)" on the basis of the small clause definitions. At this time, since "Shouga-wo surioroshi, (Grate ginger,)", "niku-wo tabeyasui ookisani kiri, (cut meat into easy-to-eat size,)", "negi-wo kizande (chop up welsh onion", and "yoku mazeawaseru. (and mix up well.)" correspond to the definitions of "*+inflectional termination of continuative form+comma", "*+inflectional termination of continuative form+comma", "*+verb continuative form", and "*+verb conclusive form+period", respectively, they are divided as small clauses. The sentence dividing apparatus then creates a small clause string by sequentially connecting "Shouga-wo surioroshi,", "niku-wo tabeyasui ookisani kiri,", "negi-wo kizande", and "yoku mazeawaseru."

The sentence dividing apparatus compares the created small clause string with typical patterns stored in the typical pattern storage unit next (see FIG. 1(2)).

For example, the sentence dividing apparatus compares the small clause string constituted by "Shouga-wo surioroshi," defined by the small clause label of (inflectional/continuative), "niku-wo tabeyasui ookisani kiri," defined by the small clause label of (inflectional/continuative), "negi-wo kizande" defined by the small clause label of (continuative), and "yoku mazeawaseru" defined by the small clause label of (conclusive) with the typical pattern of "(inflectional/continuative)+(inflectional/continuative)+(continuative)+(conclusive)→[preparation 1]+[preparation 2]+[preparation 3]+[processing]".

The sentence dividing apparatus then selects a typical pattern determined to match the small clause string as a typical sentence division result (see FIG. 1(3)).

To give a description for the example of FIG. 1, since the small clause string matches the typical pattern, the sentence dividing apparatus selects, for example, the typical pattern of "[preparation 1]+[preparation 2]+[preparation 3]+[processing]" as the typical sentence division result. In addition, the sentence dividing apparatus may output the typical pattern selected as the typical sentence division result in association with the small clause string to a display, a printer, or a storage unit.

Accordingly, the sentence dividing apparatus according to the embodiment 1 can obtain a very appropriate division result for a whole sentence when dividing very typical sentences.

Configuration of Sentence Dividing Apparatus According to Embodiment 1

A configuration of the sentence dividing apparatus according to the embodiment 1 will be described next using FIGS. 2 to 9.

Figure 2:
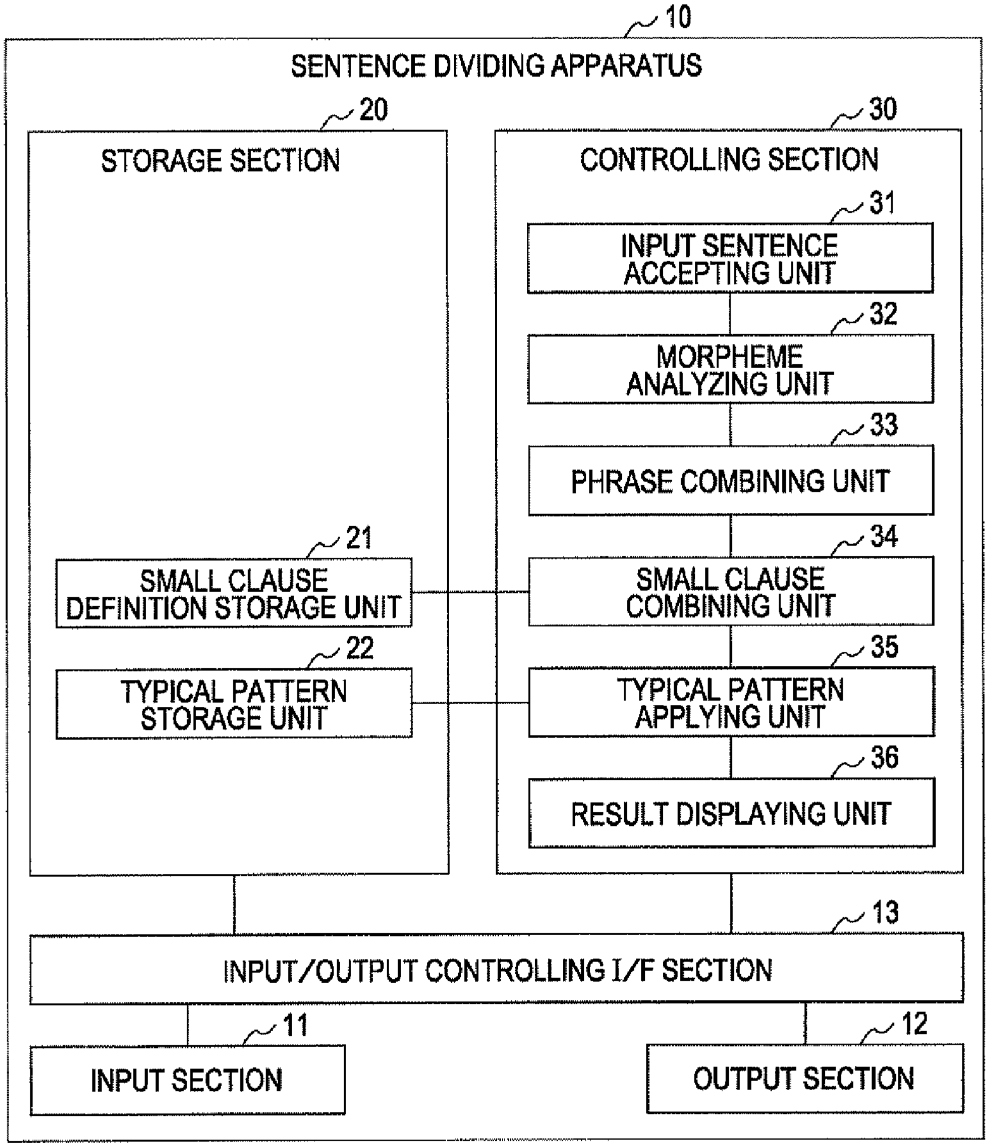
FIG. 2 is a block diagram showing a configuration of a sentence dividing apparatus according to an embodiment 1.

As shown in FIG. 2, a sentence dividing apparatus 10 according to the embodiment 1 is constituted by an input section 11, an output section 12, an input/output controlling I/F section 13, a storage section 20, and a controlling section 30.

The input section 11 corresponds to a keyboard, a mouse, a recording medium, or a communication unit for receiving data used in various kinds of processing performed by the controlling section 30 and operation instructions for performing the various kinds of processing. More specifically, the input section 11 receives typical sentences accepted by an input sentence accepting unit 31, which will be described later. The input section 11 also receives small clause definitions and typical patterns to be registered in a small clause definition storage unit 21 and a typical pattern storage unit 21, respectively, which will be described later. The input section 11 also receives operation instructions regarding processing performed by a morpheme analyzing unit 32, which will be described later.

The output section 12 corresponds to a display or a printer that outputs results of various kinds of processing performed by the controlling section 30 and operations instructions for executing the various kinds of processing. More specifically, the output section 12 outputs screens for allowing users to input typical sentences, small clause definitions, and typical patterns through the input section 11 and division results displayed by a result displaying unit 36, which will be described later.

The input/output controlling I/F section 13 controls transfer of data between the input section 11 and the output section 12 and the storage section 20 and the controlling section 30.

The storage section 20 stores data used in various kinds of processing performed by the controlling section 30, and includes the small clause definition storage unit 21 and the typical pattern storage unit 22 as units particularly closely related to the present invention, as shown in FIG. 2. Meanwhile, the small clause storage unit 21 and the typical pattern storage unit 22 correspond to "a first storage unit" and "a second storage unit" written in the attached claims, respectively.

The small clause definition storage unit 21 stores small clause definitions. Here, in the small clause definitions, positions suitable for dividing typical sentences based on the structure of the sentences are expressed by users as property information of the sentences. More specifically, the small clause definition storage unit 21 previously stores small clause definitions before the sentence dividing apparatus 10 performs a sentence dividing process. The stored small clause definitions are utilized in the process performed by a small clause combining unit 34, which will be described later.

For example, the small clause definition storage unit 21 stores a small clause definition shown in FIG. 3. To give a description for an example of FIG. 3, the small clause definition storage unit 21 stores a small clause definition suitable for dividing a typical sentence employed in a cooking field by separating the definition into a definition item expressed as <typical small clause> and a definition item expressed as <dependency target candidate small clause>. The small clause storage unit 21 stores small clause definitions defined by expressions at the right end of phrase strings that include morphemes.

A small clause definition expressed as <typical small clause> is "*+inflectional termination of continuative form+comma". The definition of "*+inflectional termination of continuative form+comma" means that phrases from an expression that a comma follows inflectional termination of a continuative form of a verb (e.g., "~shi,") set at the right end to a phrase immediately before the next small clause on the left are connected as a small clause. Small clause definitions expressed as <dependency target candidate small clause> are "+verb continuative form" and "*+verb conclusive form+period". The definition of "+verb continuative form" means that phrases from an expression of a continuative form of a verb (e.g., "~shite") set at the right end to a phrase immediately before the next small clause on the left are connected as a small clause. Additionally, the definition of "*+verb conclusive form+period" means that phrases from an expression that a period follows a conclusive termination of a verb (e.g., "~suru.") set at the right end to a phrase immediately before the next small clause on the left are connected as a small clause. Meanwhile, the expressions (inflectional/continuative), (continuative), and (conclusive) are small clause labels attached to each of the small clause definitions for convenience.

Here, <dependency target candidate small clause> is small clauses that can be linked with, for example, an expression of "~shi". For example, regarding a sentence of "~shi, ~shi, ○○suru xx-wo □□suru (do (verb) something, do (verb) something, and □□(verb) xx (object) to be ○○)", two verbs "○○suru" and "□□suru" are considered as possible candidates to be linked with "~shi". When dividing a typical sentence, the sentence dividing apparatus finally decides the appropriate dependency target in terms of meaning on the basis of a balance of a whole sentence and a property of meanings. However, all of the possible candidates are defined in definitions of small clauses that are minimum units of the sentence dividing process.

Meanwhile, when the sentence dividing apparatus 10 divides a very typical sentence, a framework for comparing (matching) typical patterns stored in the typical pattern storage unit 22, which will be described later, and a division target sentence is necessary. At this time, desirably, comparison of the typical patterns and the sentence is performed not on the surface of the character string itself but on elements that reflect a structure of a sentence (a sentence structure), such as morphemes and phrases. In addition, since long sentences are constituted by many morphemes or phrases, it is desirable to previously collect these morphemes or phrases and to previously reduce the number of possible analysis candidates with respect to an improvement in accuracy of analysis or comparison. The small clause definitions are expressed by users as those satisfying these points.

In addition, such small clause definition differs from regular expressions serving as mere superficial clues and from grammar rules having been utilized in traditional sentence structure analysis systems. More specifically, the grammar rules are created by a developer who is familiar with the system, and are complicated in general, as a result of which, the grammar rules are built in the system and provided. Thus, users of the system cannot modify the grammar rules according to a typical characteristic and also cannot create grammar rules regarding new types of sentences not supported by the system.

On the contrary, the small clause definitions can be created by non-engineer users who have a knowledge regarding a field to which sentences belong, and are simple in general. As a result, the small clause definitions are not provided in a system built-in state. The users of the system can modify the small clause definition according to the typical characteristic, and can also create small clause definitions regarding new types of sentences not supported by the system.

The typical pattern storage unit 22 stores typical patterns. Here, in the typical patterns, structures suitable for a typical sentence are expressed by users as combinations with each small clause definition (i.e., description of a structure of a typical sentence in a unit of a small clauses). More specifically, the typical pattern storage unit 22 previously stores typical patterns before the sentence dividing apparatus 10 performs the sentence dividing process. The stored typical patterns are utilized in a process performed by a typical pattern applying unit 35, which will be described later.

For example, the typical pattern storage unit 22 stores a typical pattern shown in FIG. 4. To give a description for an example of FIG. 4, the typical pattern storage unit 22 stores structure patterns of typical sentences employed in the cooking field. Here, "P1", "P2", and "P3" represent identification numbers of typical patterns. On the right of the identification numbers, a matching target input small clause strings are written in a unit of small clause definition. In addition, typical patterns corresponding to matching small clauses are written at a line next to a symbol "→". Here, the input small clause string is written using the small clause labels, such as "inflectional/continuative", while the typical pattern is written using structure labels, such as "[preparation 1]". In addition, a symbol "+" represents connection in the small clause string and the typical pattern.

In each of "P1" and "P2", the number of small clause labels and the number of structure labels match and thus have a one-to-one correspondence. "((continuative)+(conclusive))" in the input of "P3" indicates that the small clause labels are collectively treated, and the input of "(continuative)+(conclusive)" corresponds to an output of "[processing]".

In addition, "preparation 1" to "preparation 4" represent corresponding coking preparation steps, while [processing] represents processing to be performed on the ingredients having been prepared at the preparation steps. That is, for example, the typical pattern of "(inflectional/continuative)+(inflectional/continuative)+(continuative)+(conclusive)→[preparation 1]+[preparation 2]+[preparation 3]+[processing]" means that, if the small clause labels of a small clause string of a typical sentence are "(inflectional/continuative)+(inflectional/continuative)+(continuative)+(conclusive)", the typical sentence has a structure of sequentially including three cooking preparation steps and processing to be performed on the ingredients having been prepared at the preparation steps at last.

As in the case of the small clause definitions, such typical patterns differ from grammar rules having been utilized in traditional sentence structure analysis systems. More specifically, the typical patterns can be created by non-engineer users who have a knowledge regarding a field to which sentences belong, and are simple in general. As a result, the typical patterns are not provided in a system built-in state. The users of the system can modify the typical patterns according to the typical characteristic, and can also create typical patterns regarding new types of sentences not supported by the system.

The controlling section 30 controls the sentence dividing apparatus 10 to execute various kinds of processing. As shown in FIG. 2, the controlling section 30 includes the input sentence accepting unit 31, the morpheme analyzing unit 32, a phrase combining unit 33, the small clause combining unit 34, the typical pattern applying unit 35, and the result displaying unit 36 as units particularly closely related to the present invention. The small clause combining unit 34 corresponds to "a small clause creating operation" written in the attached claims, while the typical pattern applying unit 35 corresponds to "a comparing operation" and "a selecting operation" written in the attached claims.

The input sentence accepting unit 31 accepts an input of a typical sentence serving as a target of a sentence dividing process of the sentence dividing apparatus 10. More specifically, the input sentence accepting unit 31 accepts typical sentences input through the input section 11. The accepted typical sentences are utilized in the process performed by the morpheme analyzing unit 32. For example, the input sentence accepting unit 31 accepts a typical sentence shown in FIG. 5. To give a description for an example of FIG. 5, the input sentence accepting unit 31 accepts a typical sentence of "Shouga-wo surioroshi, niku-wo tabeyasui ookisani kiri, negi-wo kizande yoku mazeawaseru. (Grate ginger, cut meat into easy-to-eat size, chop up welsh onion and mix up well.)".

The morpheme analyzing unit 32 analyzes morphemes of typical sentences. More specifically, the morphemes analyzing unit 32 analyzes the typical sentence accepted by the input sentence accepting unit 31 into morphemes. The typical sentence analyzed into morphemes is utilized in a process performed by the phrase combining unit 33.

The phrase combining unit 33 combines phrases of the morpheme-analyzed typical sentence. More specifically, the phrase combining unit 33 creates a phrase string from the typical sentence analyzed into morphemes by the morpheme analyzing unit 32. The created phrase string is utilized in a process performed on the small clause combining unit 34. For example, the phrase combining unit 33 combines phrases as shown in FIG. 6 to create a phrase string. To give a description for an example of FIG. 6, the phrase combining unit 33 combines phrases of "Shouga-wo", "surioroshi,", "niku-wo", "tabeyasui", "ookisani", "kiri,", "negi-wo", "kizande", "yoku", and "mazeawaseru." to create a phrase string including the phrases. Meanwhile, such processing performed by the phrase combining unit 33 can be realized by performing phrase combination employed in the related art.

The small clause combining unit 34 combines the phrases of the typical sentence on the basis of the small clause definitions to create a small clause string including the combined small clauses. More specifically, the small clause combining unit 34 creates a small clause string from the phrase string created by the phrase combining unit 33 on the basis of the small clause definitions stored in the small clause definition storage unit 21. The created small clause string is utilized in a process performed by the typical pattern applying unit 35. For example, as shown in FIG. 7, the small clause combining unit 34 combines small clauses to create a small clause string. To give a description for an example of FIG. 7, the small clause combining unit 34 combines small clauses of "Shouga-wo surioroshi,", "niku-wo tabeyasui ookisani kiri,", "negi-wo kizande", and "yoku mazeawaseru." to create a small clause string including the small clauses.

For example, the small clause combining unit 34 divides a division target typical sentence of "Shouga-wo surioroshi, niku-wo tabeyasui ookisani kiri, negi-wo kizande yoku mazeawaseru. (Grate ginger, cut meat into easy-to-eat size, chop up welsh onion and mix up well.)" on the basis of the small clause definitions stored in the small clause definition storage unit 21. At this time, as shown in FIG. 7, since "Shouga-wo surioroshi, (Grate ginger,)", "niku-wo tabeyasui ookisani kiri, (cut meat into easy-to-eat size)", "negi-wo kizande (chop up welsh onion)", and "yoku mazeawaseru. (and mix up well.)" correspond to the definitions of "+inflectional termination of continuative form+comma", "*+inflectional termination of continuative form+comma", "*+verb continuative form", and "*+verb conclusive form+period", respectively, they are divided as small clauses. The sentence dividing apparatus then creates a small clause string sequentially including "Shouga-wo surioroshi,", "niku-wo tabeyasui ookisani kiri,", "negi-wo kizande", and "yoku mazeawaseru.". In this manner, the small clause combining unit 34 creates a small clause string shown in FIG. 8.

The typical pattern applying unit 35 compares a small clause string with typical patterns, and selects a pattern determined to match the string as a typical sentence division result. More specifically, the typical pattern applying unit 35 compares the small clause string created by the small clause combining unit 34 with the typical patterns stored in the typical pattern storage unit 22, and selects a typical pattern determined to match the small clause string as a typical sentence dividing result. The selected typical pattern is utilized in a process performed by the result displaying unit 36.

For example, the typical pattern applying unit 35 compares the small clause string constituted by "Shouga-wo surioroshi," attached with the small clause label of (inflectional/continuative), "niku-wo tabeyasui ookisani kiri," attached with the small clause label of (inflectional/continuative), "negi-wo kizande" attached with the small clause label of (continuative), and "yoku mazeawaseru." attached with the small clause label of (conclusive) with a typical pattern "P1" of "(inflectional/continuative)+(inflectional/continuative)+(continuative)+(conclusive)→[preparation 1]+[preparation 2]+[preparation 3]+[processing]". Since the small clause string matches the typical pattern "P1", the typical pattern applying unit 35 selects the typical pattern "P1" of "[preparation 1]+[preparation 2]+[preparation 3]+[processing]" as the typical sentence division result as shown in FIG. 9.

Meanwhile, upon receiving the small clause string created by the small clause combining unit 34, the typical pattern applying unit 35 according to the embodiment 1 performs comparison from a typical pattern at the top of a file (the first pattern "P1"), and advances the comparison to patterns "P2" and "P3", and then finishes the process when the string first matches the typical pattern (since the input sentence matches the pattern "P1" herein, the typical pattern applying unit 35 finishes the process here, and outputs a structure label string of "P1"). However, the present invention is not limited to this particular example. In a manner described in an embodiment 2, the typical pattern applying unit 35 may perform comparison of the string with each of typical patterns, and may select a typical pattern that gives the highest matching score.

The result displaying unit 36 displays a typical sentence division result. More specifically, the result displaying unit 36 outputs a typical pattern selected by the typical pattern applying unit 35 to the output section 12. For example, the result displaying unit 36 may output the typical pattern selected as the typical sentence division result in association with the small clause string in a format shown in FIG. 9 (e.g., a format associating structural element string with corresponding structure labels) to a display, a printer, or a storage unit.

Process Performed by Sentence Dividing Apparatus According to Embodiment 1

Figure 10:
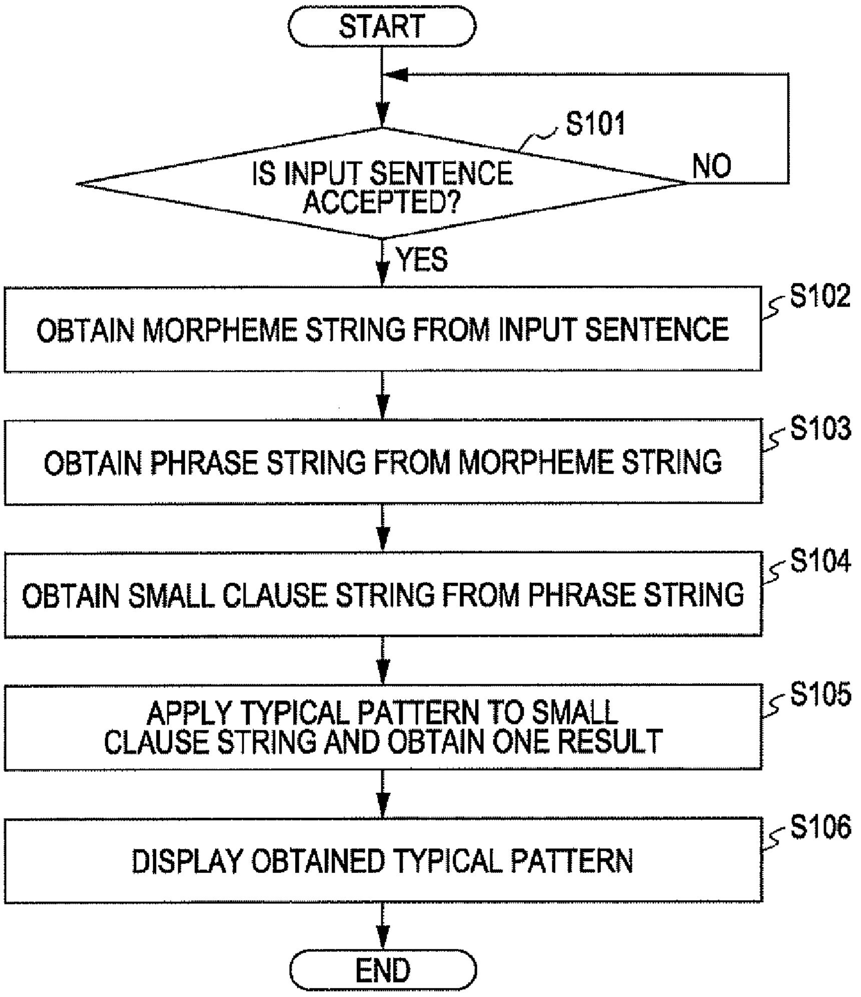
FIG. 10 is a flowchart showing a process performed by a sentence dividing apparatus according to an embodiment 1.

A process performed by the sentence dividing apparatus according to the embodiment 1 will be described next using FIG. 10. FIG. 10 is a flowchart showing a process performed by the sentence dividing apparatus according to the embodiment 1.

Firstly, the sentence dividing apparatus 10 according to the embodiment 1 determines whether or not the input sentence accepting unit 31 has accepted an input sentence (i.e., a typical sentence that is a target of sentence dividing processing) (operation S101). If the input sentence accepting unit 31 has not accepted the input sentence (NO of operation S101), the processing returns the operation of determining whether or not the input sentence accepting unit 31 has accepted an input sentence.

On the other hand, if the input sentence accepting unit 31 has accepted the input sentence (YES of operation S101), the morpheme analyzing unit 32 of the sentence dividing apparatus 10 obtains a morpheme string from the input sentence (operation S102). The phrase combining unit 33 of the sentence dividing apparatus 10 then obtains a phrase string from the morpheme string (operation S103).

Subsequently, the small clause combining unit 34 of the sentence dividing apparatus 10 obtains a small clause string from the phrase string (operation S104). More specifically, the small clause combining unit 34 of the sentence dividing apparatus 10 obtains the small clause string on the basis of the small clause definitions stored in the small clause definition storage unit 21.

The typical pattern applying unit 35 of the sentence dividing apparatus 10 then applies typical patterns to the small clause string to obtain one result (operation S105). More specifically, the typical pattern applying unit 35 of the sentence dividing apparatus 10 retrieves a matching typical pattern while referring to the typical patterns stored in the typical pattern storage unit 22, and finishes the processing at the time the string first matches the typical pattern.

Thereafter, the result displaying unit 36 of the sentence dividing unit 10 displays the obtained typical pattern (operation S106). Although a method that the sentence dividing apparatus 10 according to the embodiment 1 obtains a morpheme string from an input sentence, obtains a phrase string from the morpheme string, and then creates a small clause string has been described, the present invention is not limited to this particular example. The present invention can be similarly applied to a method for obtaining a morpheme string from an input sentence and creating a small clause string directly from the morpheme string or a method for creating a small clause string directly from an input sentence.

Accordingly, the sentence dividing apparatus according to the embodiment 1 can obtain a very appropriate dividing result for a whole sentence when dividing a very typical sentence.

Advantages of Embodiment 1

As described above, the embodiment 1 allows a very appropriate dividing result to be obtained for a whole sentence when a very typical sentence is divided. In addition, the embodiment 1 allows very typical sentences to be divided simply and flexibly.

More specifically, when a sentence dividing apparatus divides a very typical sentence, a framework for comparing (matching) structure patterns (i.e., typical patterns) specified by users with a division target sentence is necessary. At this time, desirably, comparison of the structure patterns and the sentence is performed not on the surface of the character string itself but on elements that reflect the structure of the sentence (the sentence structure), such as morphemes and phrases. In addition, since long sentences are constituted by many morphemes or phrases, it is desirable to collect these morphemes or phrases beforehand, and to reduce the number of possible analysis candidates with respect to an improvement in accuracy of analysis or comparison beforehand.

A unit constituted by morphemes and phrases according to a typical characteristic is referred as a "small clause". Since morphemes and phrases are collected as "small clauses" beforehand, the embodiment 1 can improve the accuracy of analysis or comparison. That is, an introduction of a structural element of "small clauses" into a superficial pattern matching processing performed on a typical sentence can integrate the superficial pattern matching and the structural matching. In addition, it becomes possible to simplify structure patterns written by users, which allows non-engineer users having a knowledge regarding a field to which sentences belong who is not a developer familiar to the system to specify positions of dividing a sentence by writing simple structure patterns.

Embodiment 2

Although a method for allowing a sentence dividing apparatus to compare a created small clause string with a plurality of typical patterns, and to select a typical pattern that is determined first to match the small clause string as a division result has been described as the embodiment 1, the present invention is not limited to this particular method. The present invention can be similarly applied to a method for allowing a sentence dividing apparatus to compare a created small clause string with a plurality of typical patterns, and to select an optimum typical pattern as a division result from typical patterns determined to match the small clause string. That is, the sentence dividing apparatus extracts a plurality of structural possibilities and then selects an optimum candidate therefrom, thereby being able to further improve the accuracy of analysis or comparison. In the following, a method for selecting an optimum typical pattern as a division result will be described as an embodiment 2. A description regarding portions of a sentence dividing apparatus according to the embodiment 2 that are similar to those of the sentence dividing apparatus according to the embodiment 1 is omitted, and functions that are characteristic to the sentence dividing apparatus according to the embodiment 2 will be mainly described.

Configuration of Sentence Dividing Apparatus According to Embodiment 2

Firstly, a configuration of the sentence dividing apparatus according to the embodiment 2 will be described using FIGS. 11 to 19.

Figure 11:
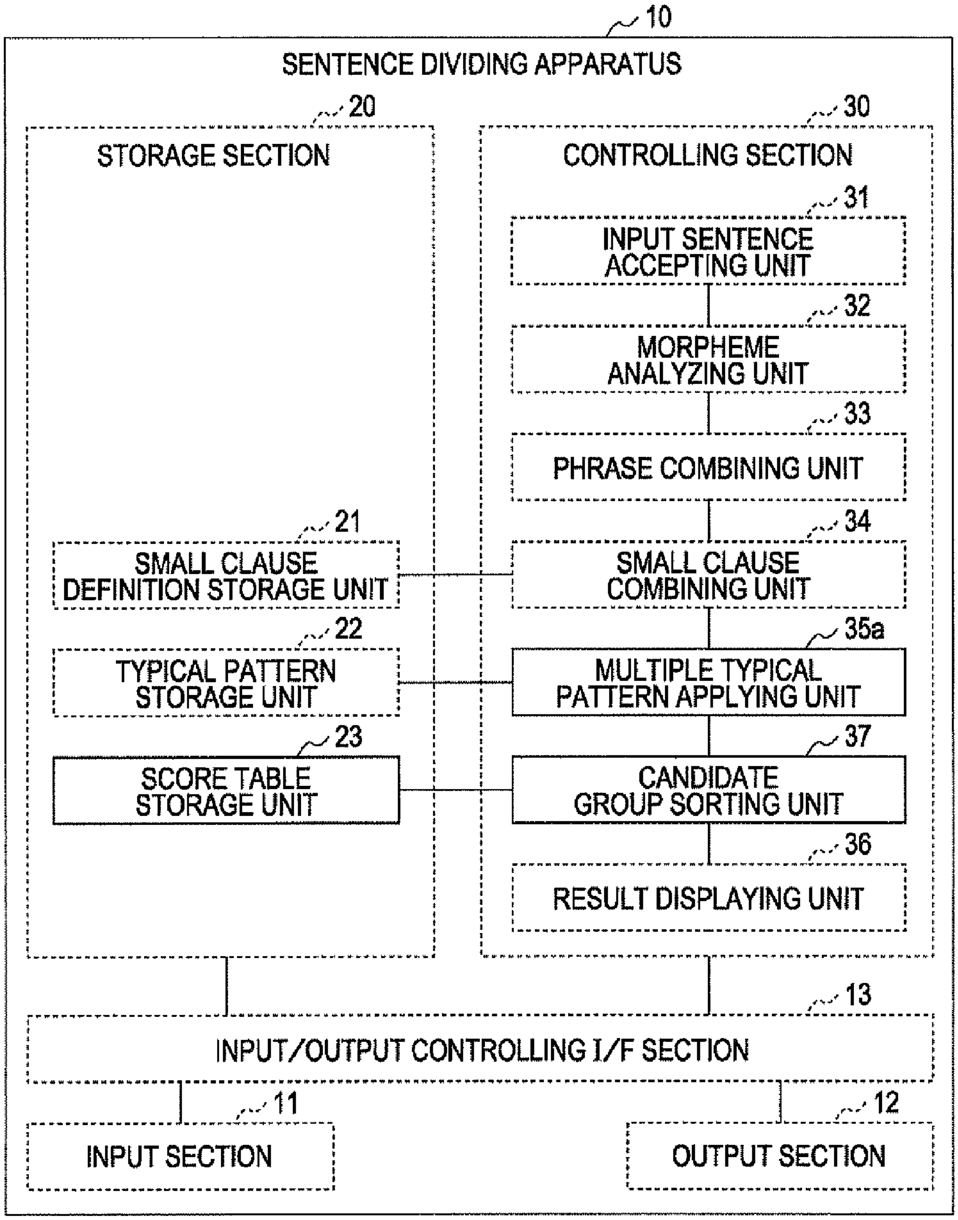
FIG. 11 is a block diagram showing a configuration of a sentence dividing apparatus according to an embodiment 2.

As shown in FIG. 11, the typical pattern applying unit 35 employed in the embodiment 1 is replaced with a multiple typical pattern applying unit 35*a* in a sentence dividing apparatus 10 according to the embodiment 2. In addition, a score table storage unit 23 is added to a storage section 20. Furthermore, a candidate group storing unit 37 is also added to a controlling section 30. The embodiment 2 differs from the embodiment 1 in these points. Meanwhile, referring to FIG. 11, a dotted line indicates portions of the sentence dividing apparatus 10 according to the embodiment 2 that have configurations similar to those of the sentence dividing apparatus according the embodiment 1. A solid line indicates portions of the sentence dividing apparatus 10 according to the embodiment 2 that have configurations different from those of the sentence dividing apparatus according the embodiment 1. The dotted line and the solid line are used for convenience' sake.

Firstly, portions different from those of the sentence dividing apparatus 10 according to the embodiment 1 will be particularly described. The score table storage unit 23 stores score tables that evaluate a degree of matching of a small clause string and each of a plurality of typical patterns. More specifically, the score table storage unit 23 stores, for each of typical patterns that are determined to match a small clause string by the multiple typical pattern applying unit 35*a*, a score table that evaluates the degree of matching of the small clause string and the typical pattern. The stored score tables are utilized in the processing performed by the candidate group sorting unit 37, which will be described later.

For example, the score table storage unit 23 stores a score table shown in FIG. 12. To give a description for an example of FIG. 12, the score table storage unit 23 defines scoring points given to parallel structures regarding each of a plurality of typical patterns (candidates) determined to match a small clause string. The scoring points given to the parallel structures are obtained by multiplying the number of parallel elements by the matching points.

In <match of particle elements>, "(a)", "(b)", and "(c)" represent identification numbers of point items. For example, (a) defines that, "when all of parallel elements include 'a particle of HA'", a point of "+3" is added. That is, for example, when a sentence that "A-ha ~shi, B-ha ~shi, C-ha ~suru. (A does ~, B does ~, and C does ~.)" is input as a typical sentence, the number of parallel elements is "3" and a matching point of "3" based on the particle element is obtained since all of the parallel elements has the "particle of ha". Thus, the product of 3×3=9 is the total scored point.

Other rules will be described. In <match of particle elements>, for example, (b) defines that a point of '+3' is added "when all of parallel elements include 'a particle of wo'". Similarly, (c) defines that a point of '+2' is added "when all of parallel elements include 'a particle of ni'". In addition, in <match of verbs at right end>, for example, (d) defines that a point of "+5" is added "when all of verbs at the right end are an identical verb", while (e) defines that a point of "+3" is added "when all of verbs at the right end are an identical voice". Additionally, in "match of numbers of phrases", for example, (f) defines that a point of "+2" is added "when all of parallel elements includes the identical number of phrases".

As in the case of small clause definitions and typical patterns, such score tables differ from grammar rules having been utilized in traditional sentence structure analyzing systems. More specifically, non-engineer users having a knowledge regarding a field to which sentences belong can create scoring tables, and the score tables are simple in general. As a result, the score tables are not provided in a system built-in state. The users of the system can modify the score tables according to the typical characteristic, and can also create score tables regarding new types of sentences not supported by the system.

As in the case of the embodiment 1, the multiple typical pattern applying unit 35*a* compares a small clause string with typical patterns, but does not select a typical pattern that is determined first to match the small clause string. The multiple typical pattern applying unit 35*a* differs from that of the embodiment 1 in selecting all of typical patterns determined to match the small clause string as division results after comparing a created small clause string with a plurality of typical patterns.

The candidate group sorting unit 37 sorts the plurality of typical patterns (i.e., a group of candidates) selected as the division results. More specifically, when a plurality of typical patterns are determined to match a small clause string as a result of comparison performed by the multiple typical pattern applying unit 35*a*, the candidate group sorting unit 37 evaluates the degree of matching of the small clause string and each of the plurality of typical patterns on the basis of the score tables stored in the score table storage unit 23. The candidate group sorting unit 37 then sorts the order of the plurality of typical patterns determined to match the small clause string according to the result of the evaluation. For example, the candidate group sorting unit 37 performs scoring for each of the plurality of matching typical patterns with reference to the score tables stored in the score table storage unit 23, and sorts the typical pattern candidates in a descending order of the points. Meanwhile, the candidate group sorting unit 37 corresponds to "a evaluating operation" and "a sorting operation" of the attached claims.

In the following, a series of processing operations performed by the sentence dividing apparatus 10 according to the embodiment 2 will be described next using examples shown in FIGS. 13 to 19. In the embodiment 2, the description will be given using "a sentence 1" and "a sentence 2" having a similar structure.

An input sentence accepting unit 31 according to the embodiment 2 accepts typical sentences shown in FIG. 13, for example. To give a description for an example of FIG. 13, the input sentence accepting unit 31 accepts a typical sentence "sentence 1" of "Shouga-wo surioroshi, niku-wo tabeyasui ookisani kiri, negi-wo kizande yoku mazeawaseru. (Grate ginger, cut meat into easy-to-eat size, chop up welsh onion and mix up well.)" and a typical sentence "sentence 2" of "Shouga-wo surioroshi, niku-wo tabeyasui ookisani kiri, nesshita nabe-ni tounyushite itameru. (Grate ginger, cut meat into easy-to-eat size, put them into heated pan and fry.)".

A phrase combining unit 33 according to the embodiment 2 combines phrases, for example, in a manner shown in FIG. 14 to create a phrase string. To give a description for an example of FIG. 14, the phrase combining unit 33 combines phrases of "Shouga-wo", "surioroshi,", "niku-wo", "tabeyasui", "ookisani", "kiri,", "negi-wo", "kizande,", "yoku", and "mazeawaseru." of the "sentence 1" to create a phrase string including the phrases. In addition, the phrase combining unit 33 similarly combines phrases of "Shouga-wo", "surioroshi,", "niku-wo", "tabeyasui", "ookisani", "kiri,", "nesshita", "nabe-ni", "tounyushite", and "itameru." of the "sentence 2" to create a phrase sentence including the phrases.

A small clause combining unit 34 according to the embodiment 2 combines small clauses, for example, in a manner shown in FIG. 15 to create a small clause string. To give a description for an example of FIG. 15, the small clause combining unit 34 combines small clauses of "Shouga-wo surioroshi,", "niku-wo tabeyasui ookisani kiri,", "negi-wo kizande", and "yoku mazeawaseru." of the "sentence 1" to create a small clause string including the small clauses. In addition, the small clause combining unit 34 similarly combines small clauses of "Shouga-wo surioroshi,", "niku-wo tabeyasui ookisani kiri,", "nesshita nabe-ni tounyushite", and "itameru." of the "sentence 2" to create a small clause string including the small clauses. In this manner, the small clause combining unit 34 generates small clause strings shown in FIG. 16.

As in the case of the embodiment 1, the multiple typical pattern applying unit 35*a* compares, for example, a small clause string constituted by "Shouga-wo surioroshi," defined by a small clause label of (inflectional/continuative), "niku-wo tabeyasui ookisani kiri," defined by a small clause label of (inflectional/continuative), "negi-wo kizande" defined by a small clause label of (continuative), and "yoku mazeawaseru." defined by a small clause label of (conclusive) with a typical pattern "P1" of "(inflectional/continuative)+(inflectional/continuative)+(continuative)+(conclusive)→[preparation 1]+[preparation 2]+[preparation 3]+[processing]". Since the small clause string matches the typical pattern "P1", the multiple typical pattern applying unit 35*a* selects the typical pattern "P1" of "[preparation 1]+[preparation 2]+[preparation 3]+[processing]" as a typical sentence division result, as shown in FIG. 17.

In addition, the multiple typical pattern applying pattern 35*a* further compares the small clause string with typical patterns "P2" and "P3". More specifically, the multiple typical pattern applying pattern 35*a* compares the small clause string with the typical pattern "P3" of "(inflectional/continuative)+(inflectional/continuative)+((continuative)+(conclusive))→[preparation 1]+[preparation 2]+[processing]". Since the small clause string matches the typical pattern "P3", the multiple typical pattern applying unit 35*a* also selects the typical pattern "P3" of "[preparation 1]+[preparation 2]+[processing]" as the typical sentence division result as shown in FIG. 17. If the multiple typical pattern applying pattern 35*a* receives the "sentence 1", the input sentence matches the typical patterns "P1" and "P3". These matches are represented as "sentence 1-P1" and "sentence 1-P3".

Similarly, the multiple typical pattern applying unit 35*a* compares the small clause string of the "sentence 2" with each of the typical patterns "P1", "P2", and "P3", and selects all of typical patterns determined to match the small clause string as the typical sentence division results (candidates). If the multiple typical pattern applying unit 35*a* receives the "sentence 2", the small clause string matches the typical patterns "P1" and "P3". These matches are represented as "sentence 2-P1" and "sentence 2-P3".

For example, as shown by "sentence 1-P1" of FIG. 18, the candidate group sorting unit 37 adds a point of "+3" with reference to the score table stored in the score table storage unit 23 since "all of parallel elements of "Shouga-wo surioroshi,", "niku-wo tabeyasui ookisani kiri,", and "negi-wo kizande," have 'a particle of wo'". In addition, the candidate group sorting unit 37 also adds a point of "+3" since "all of verbs at the right end is an identical voice". A product of this result and the number of parallel elements is equal to "18" as shown by "sentence 1-P1" of FIG. 18.

Additionally, for example, as shown by "sentence 2-P1" of FIG. 18, the candidate group sorting unit 37 adds a point of "+3" since "all of verbs at the right end of parallel elements of "Shouga-wo surioroshi,", "niku-wo tabeyasui ookisani kiri,", and "nesshita nabe-ni tounyushite" are an identical voice". A product of this result and the number of parallel elements is equal to "9" as shown by "sentence 2-P1" of FIG. 18.

Similarly, as shown in FIG. 18, the candidate group sorting unit 37 evaluates the scored points regarding "sentence 1-P3" and "sentence 2-P3". The candidate group sorting unit 37 then sorts the order of the plurality of typical patterns (candidates) in a manner shown in FIG. 19. For example, regarding the "sentence 1", the scored point of "sentence 1-P1" is "18", while the scored point of "sentence 1-P3" is "12". Accordingly, the typical pattern "P1" is a first candidate, while the typical pattern "P3" is a second candidate. In such a manner, the candidate group sorting unit 37 sorts the order of the plurality of typical patterns (candidates).

Similarly, as shown in FIG. 19, the scored point of "sentence 2-P3" is "12", while the scored point of "sentence 2-P1" is "9" regarding, for example, the "sentence 2". Accordingly, the typical pattern "P3" is a first candidate, while the typical pattern "P1" is a second candidate. In such a manner, the candidate group sorting unit 37 sorts the order of the plurality of typical patterns (candidates).

Meanwhile, as in the case of the embodiment 1, a result displaying unit 36 may output the plurality of sorted typical patterns in association with the small clause strings, for example, in a format shown in FIG. 19 to a display, a printer, or a storage unit.

Process Performed by Sentence Dividing Apparatus According to Embodiment 2

Figure 20:
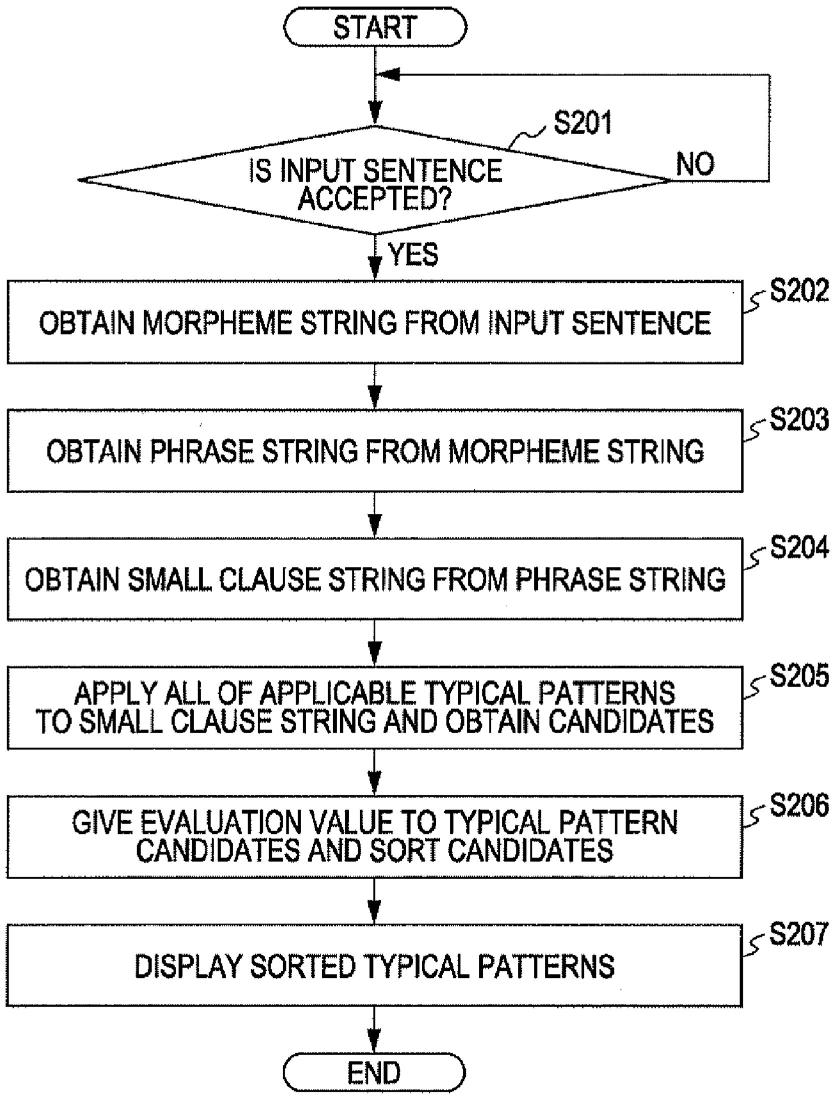
FIG. 20 is a flowchart showing a process performed by a sentence dividing apparatus according to an embodiment 2.

A process performed by the sentence dividing apparatus according to the embodiment 2 will be described next using FIG. 20. FIG. 20 is a flowchart showing a process performed by the sentence dividing apparatus according to the embodiment 2.

Firstly, as in the case of the embodiment 1, the sentence dividing apparatus 10 according to the embodiment 2 determines whether or not the input sentence accepting unit 31 has accepted an input sentence (operation S201). The morpheme analyzing unit 32 obtains a morpheme string from the input sentence next (operation S202). The phrase combining unit 33 then obtains a phrase string from the morpheme string (operation S203).

Subsequently, as in the case of the embodiment 1, the small clause combining unit 34 of the sentence dividing apparatus 10 obtains a small clause string from the phrase string (operation S204). Unlike the embodiment 1, the multiple typical pattern applying unit 35*a* of the sentence dividing apparatus 10 applies all of typical patterns applicable to the small clause string, and obtains a group of typical pattern candidates (operation S205).

Thereafter, unlike the embodiment 1, the candidate group sorting unit 37 of the sentence dividing apparatus 10 determines evaluation values regarding each of the typical pattern candidates, and sorts the typical pattern candidates (operation S206). Thereafter, the result displaying unit 36 of the sentence dividing apparatus 10 displays the sorted typical patterns (operation S207).

Advantages of Embodiment 2

As described above, the embodiment 2 allows an optimum candidate to be selected when a plurality of division candidates are obtained as a result.

More specifically, the sentence dividing apparatus according to the embodiment 1 finishes the processing once a structure pattern matches a small clause string, thereby making processing to be easy to handle. On the contrary, the sentence dividing apparatus according to the embodiment 2 extracts a plurality of structural possibilities and then selects an optimum candidate therefrom, thereby being able to further improve the accuracy of analysis or comparison.

Embodiment 3

Although methods for allowing a sentence dividing apparatus to directly utilize a small clause string created by the small clause combining unit 34 in processing performed by the typical pattern applying unit 35 has been described as the embodiments 1 and 2. The typical patterns are written using small clauses themselves as units. Thus, particularly when a sentence becomes longer, the number of typical patterns to be written undesirably increases, and a framework for controlling this is necessary. Accordingly, a sentence dividing apparatus according to an embodiment 3 performs sentence structure analysis in a unit of small clauses, creates a plurality of creatable tree structures, and omitting portions not directly relating to a typical expression as "trace" small clause, thereby simplifying the structure patterns dramatically. In the following, the above-described method will be described as the embodiment 3. A description regarding portions of a sentence dividing apparatus according to the embodiment 3 that are similar to those of the sentence dividing apparatuses according to the embodiments 1 and 2 is omitted, and functions that are characteristic to the sentence dividing apparatus according to the embodiment 3 will be mainly described. It is assumed that a typical sentence input to the sentence dividing apparatus according to the embodiment 3 is the same as that illustrated in FIG. 5 as a typical sentence input to the sentence dividing apparatus according to the embodiment 1.

Configuration of Sentence Dividing Apparatus According to Embodiment 3

Firstly, a configuration of the sentence dividing apparatus according to the embodiment 3 will be described using FIGS. 21 to 29.

Figure 21:
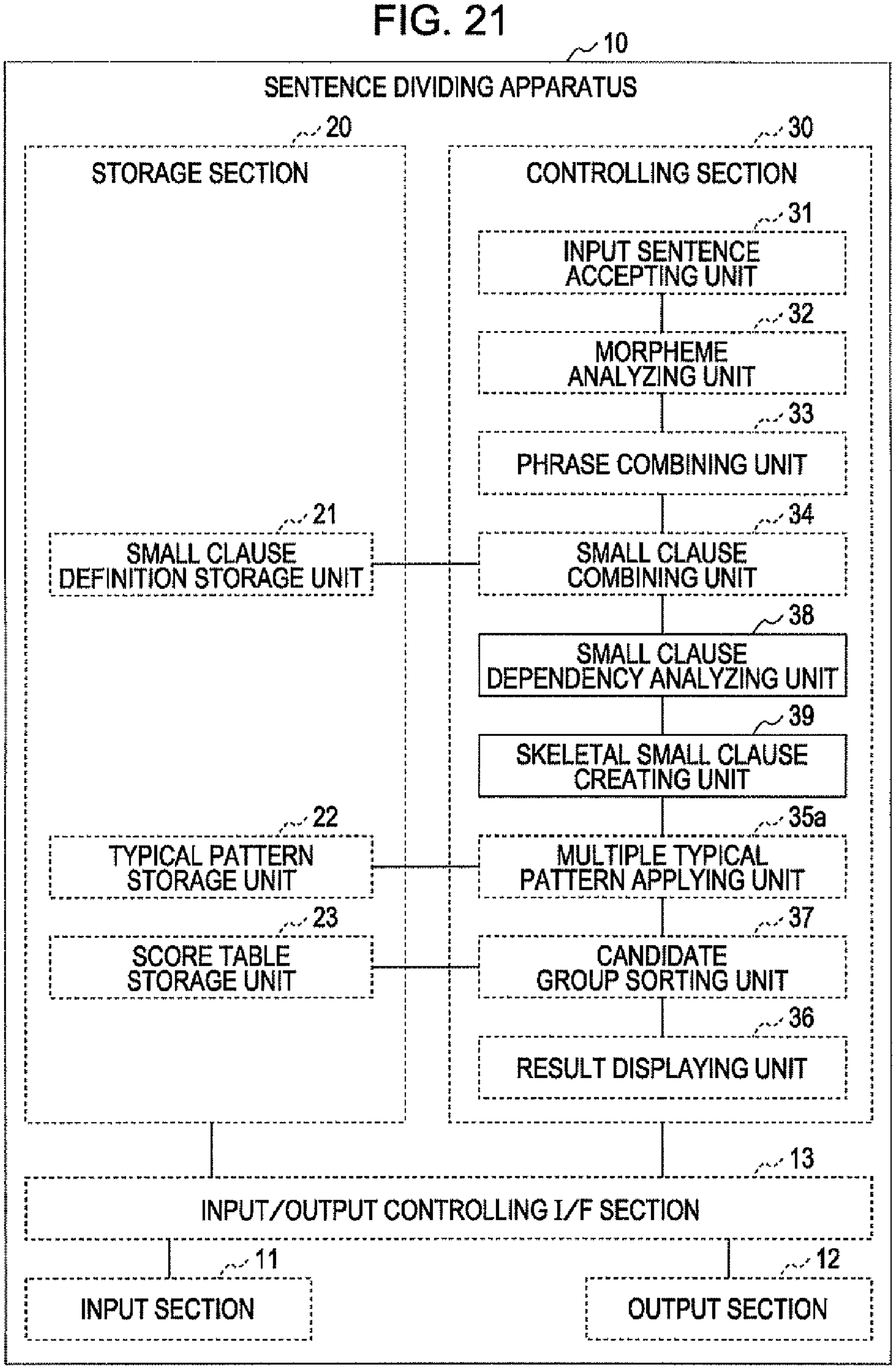
FIG. 21 is a block diagram showing a configuration of a sentence dividing apparatus according to an embodiment 3.

As shown in FIG. 21, a sentence dividing apparatus 10 according to the embodiment 3 differs from that according to the embodiment 2 in that a small clause dependency analyzing unit 38 and a skeletal small clause creating unit 39 are added to a controlling section 30.

Typical patterns according to the embodiments 1 and 2 are directly applied to a small clause string. On the contrary, typical pattern stored in a typical pattern storage unit 22 according to the embodiment 3 differs from the typical patterns according to the embodiments 1 and 2 in that the typical patterns of this embodiment are applied to a skeletal small clause as shown in FIG. 22. For example, a typical pattern "P3" according to the embodiment 3 differs from the typical pattern "P3" according to the embodiment 1 or 2. More specifically, a portion written as "(continuative)+(conclusive)" in the embodiments 1 and 2 is written simply as "(conclusive)". The skeletal small clause creating unit 39 replaces a "(continuative)" small clause by a trace, which will be described. The typical pattern is made to cope with this operation. By means of this description, it is possible to omit the description regarding small clauses that may come at the position of the "(continuative)" and that are not directly related to application of typical patterns. This can simplify the description of typical patterns without exerting an influence upon comparison of the small clause with typical patterns.

The small clause dependency analyzing unit 38 analyzes the dependency between small clauses. More specifically, the small clause dependency analyzing unit 38 analyzes the dependency between small clauses constituting a small clause string created by a small clause combining unit 34. The analysis result is utilized in processing performed by the skeletal small clause creating unit 39.

For example, as shown in FIG. 23, the small clause dependency analyzing unit 38 analyzes "a small clause property" and "a dependency target small clause/a dependency type" regarding each small clause of the small clause string created by the small clause combining unit 34. Here, the "small clause property" indicates whether this small clause is a declinable word or an indeclinable word. The "dependency target small clause/dependency type" represents possible dependency target small clauses and the dependency type thereof. There are two types of "parallel" and "modification" as the dependency type. A first small clause of "Shouga-wo surioroshi," can link to small clauses of "inflectional/continuative" and "conclusive". It is indicated that the first small clause links to a small clause of "inflectional/continuative" as the "parallel" type, whereas the first small clause links to a small clause of "conclusive" as the "modification" type. A second small clause of "niku-wo tabeyasui ookisani kiri," can link to small clauses of "continuative" and "conclusive". It is indicated that the second small clause links to a small clause of "continuative" as the "parallel type", whereas the second small clause links to a small clause of "conclusive" as the "modification" type. A third small clause of "negi-wo kizande" can link to small clauses of "conclusive" and "inflectional/continuative". It is indicated that third small clauses links to the small clauses of "conclusive" and "inflectional/continuative" as the "modification" type. A fourth small clause of "yoku mazeawaseru." does not link to other small clauses, and terminates the sentence.

Figure 24:
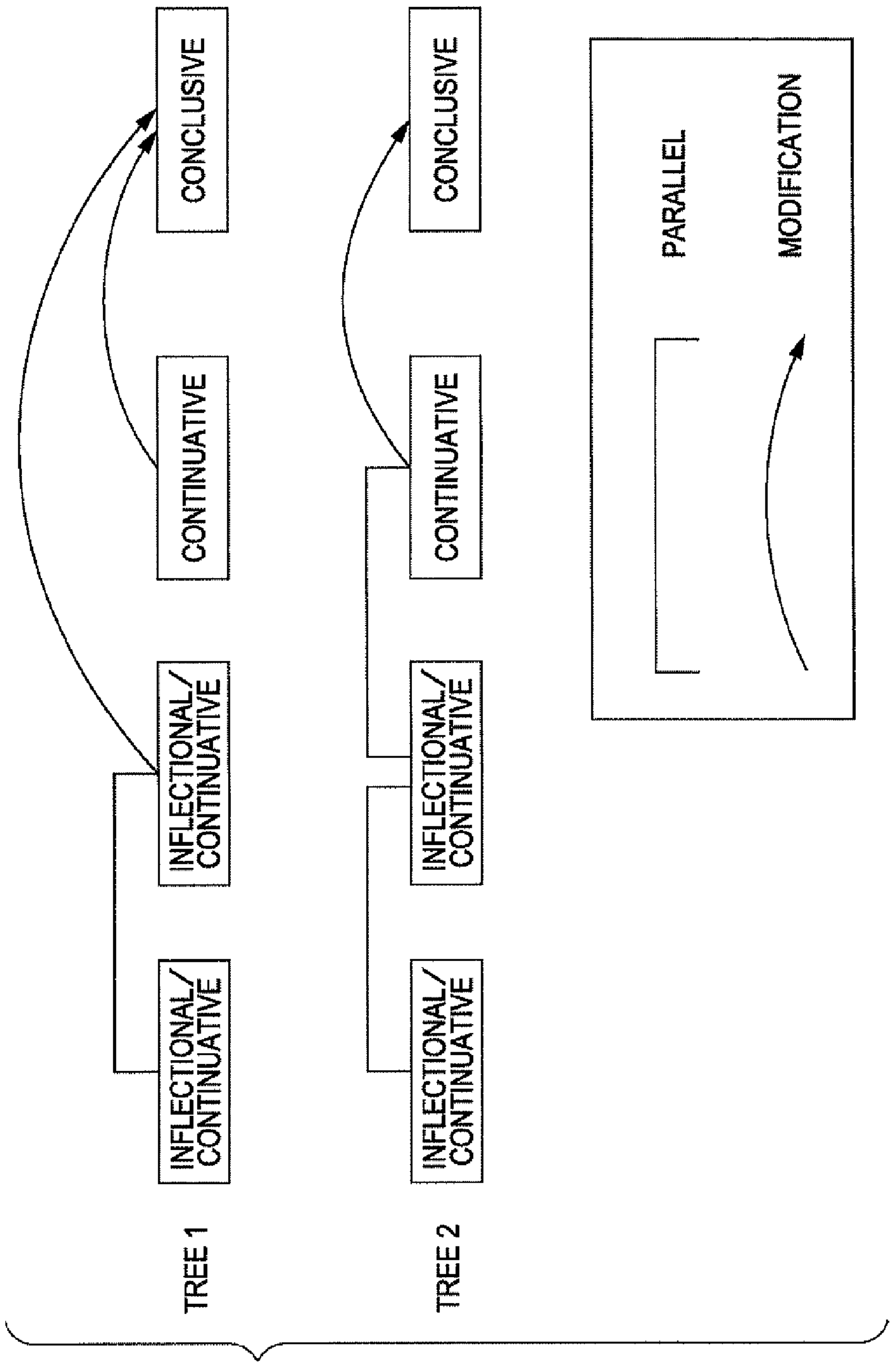
FIG. 24 is a diagram for explaining a small clause dependency analyzing unit (i.e., results of analysis of dependency between small clauses) in an embodiment 3.

For example, FIG. 24 shows a result of the analysis of the dependency between small clauses performed by the small clause dependency analyzing unit 38 according to the embodiment 3. This result is obtained by performing sentence structure analysis employed in the related art on the group of small clauses shown in FIG. 23 and the dependency analysis in a unit of small clauses. In response to FIG. 23, there are two dependency types, "parallel" and "modification". In this drawing, two candidates that can be created by inter-small-clause dependency analysis are shown as a "tree 1" and a "tree 2". In the "tree 1", two small clauses of "inflectional/continuative" are in a parallel relationship, and the rest of small clauses are linked in a modification relationship. In the "tree 2", three small clauses (i.e., two small clauses of "inflectional/continuative" and a small clause of "continuative") are in the parallel relationship, and the rest is linked in the modification relationship. The "dependency target" of the second small clause differ between the "tree 1" and the "tree 2", in response to which the "dependency type" thereof also differs. More specifically, the "dependency target small clause/dependency type" of the second small clause ("niku-wo tabeyasui ookisani kiri, (cut meat into easy-to-eat size,)" shown in FIG. 23 is "(continuative)/parallel" or "(conclusive)/modification". When this second small clause links to a fourth small clause of "conclusive", the second small clause links to the fourth small clause in the "modification" dependency type and the "tree 1" is created. On the other hand, when the second small clause links to a third small clause of "continuative", the second small clause links to the third small clause in the "parallel" dependency type and the "tree 2" is created. In such a manner, two different kinds of trees are created.

The skeletal small clause creating unit 39 transforms a small clause string into a skeletal small clause string including only skeletal small clauses. More specifically, the skeletal small clause creating unit 39 eliminates small clauses modifying skeletal small clauses that serve as a skeleton of the structure of the typical sentence according to the result of the analysis performed by the small clause dependency analyzing unit 38, thereby transforming the small clause string into a skeletal small clause string including only skeletal small clauses. The skeletal small clause string is utilized in processing performed by a multiple typical pattern applying unit 35*a*.

Figure 25:
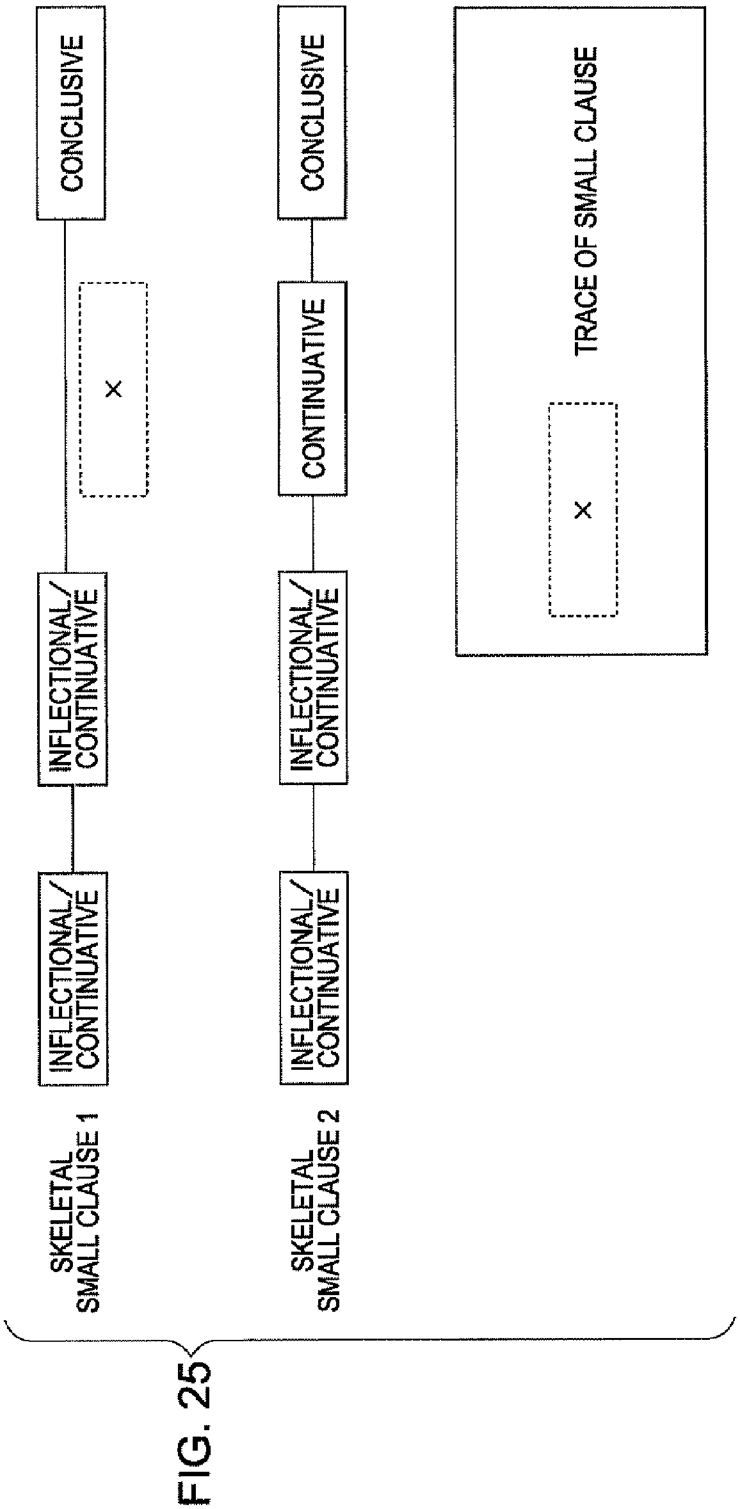
FIG. 25 is a diagram for explaining a skeletal small clause string creating unit (i.e., skeletal small clauses of an input sentence) in an embodiment 3.

For example, the skeletal small clause creating unit 39 creates a skeletal small clauses shown in FIG. 25. A "skeletal small clause 1" is created through a skeletal small clause creation operation performed on the "tree 1", whereas a "skeletal small clause 2" is created through the skeletal small clause creation operation performed on the "tree 2". In this example, a specific small clause is eliminated and treated as a "trace" depending on the form of the tree structure. The process for replacing the small clause with the "trace" is shown in FIG. 26.

Figure 26:
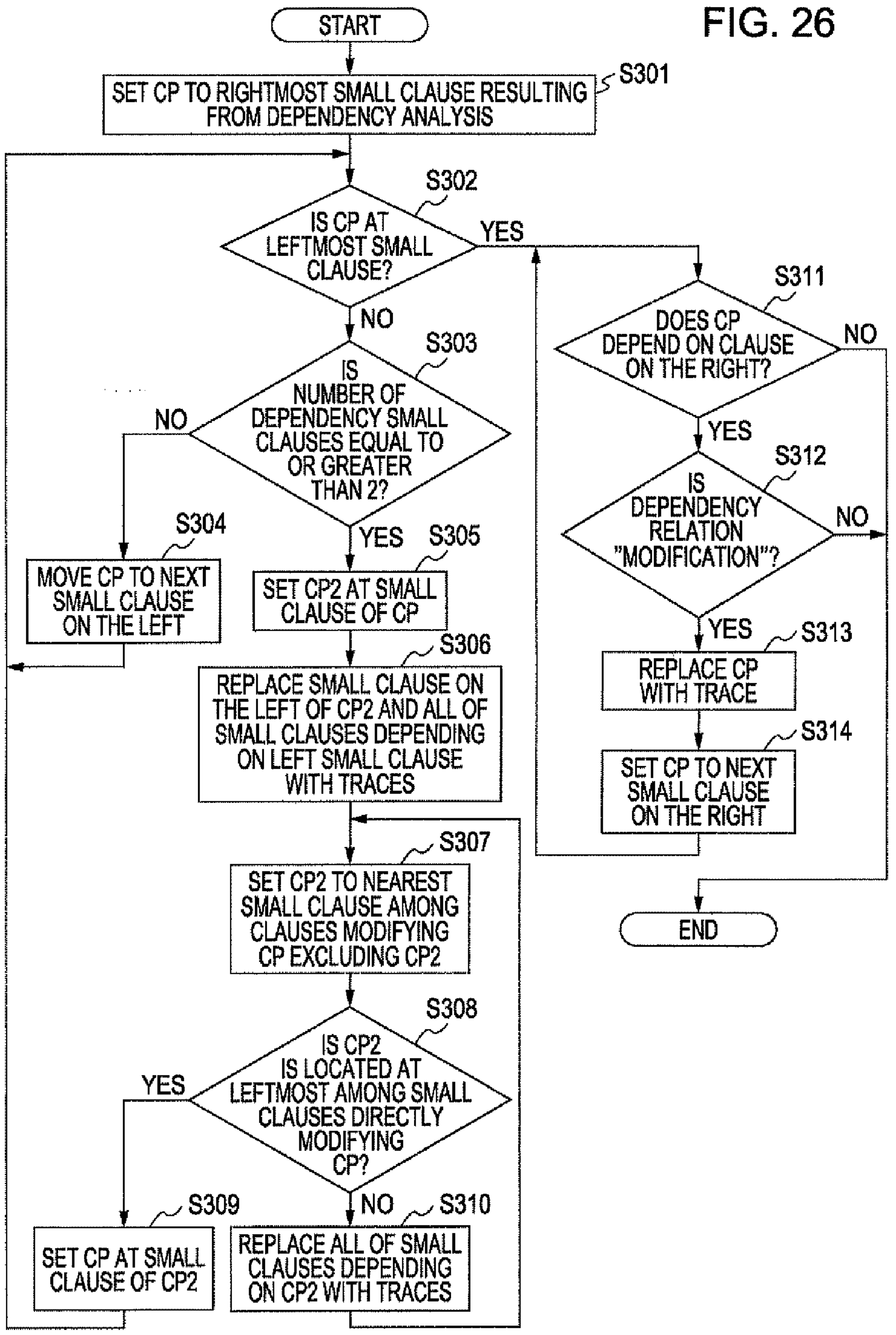
FIG. 26 is a diagram for explaining a skeletal small clause string creating unit (i.e., creation of a skeletal small clause string based on a dependency analysis result) in an embodiment 3.

FIG. 26 shows an example of a process for replacing a specific small clause with a "trace" performed on a tree structure made of small clauses. Here, "CP (current point)" represents a position of a pointer used in the processing. At the start of the processing, the CP is set to a rightmost small clause (operation S301). As a basic operation, if the number of small clauses that link to the pointer-set small clause is one (NO of operation S303), the skeletal small clause creating unit 39 moves the pointer to the next small clause on the left without performing the trace replacement (operation S304). If the number of small clauses that link to the pointer-set small clause is not one (YES of operation S303), the skeletal small clause creating unit 39 replaces the small clause on the left of the pointer-set small clause and small clauses that link to the small clause on the left with the trace (operation S306). In such a manner, the skeletal small clause creating unit 39 checks all of the plurality of linking small clauses, and then moves the pointer to the next remaining small clause on the left (operation S309) to advance the processing. In exceptional processing regarding the leftmost small clause (YES of operation S302), the processing may differ depending on the dependency relationship types (operations S311 to S314).

The multiple typical pattern applying unit 35*a* compares the skeletal small clause string (i.e., the small clause string excluding the trace small clauses) created by the skeletal small clause creating unit 39 and the arrangement of small clauses written in the typical patterns, and selects typical patterns that exactly match the skeletal small clause string. For example, FIG. 27 shows a result of applying typical patterns to skeletal small clause strings. Since exact matching is obtained regarding a combination of the skeletal small clause string 1 and a typical pattern P3 and a combination of the skeletal small clause string 2 and a typical pattern P1, FIG. 27 shows these two combinations. In each candidate, the matching result and the structure labels attached to the typical pattern are shown.

As in the case of the embodiment 2, a candidate group sorting unit 37 calculates a scored point with reference to a score table stored in a score table storage unit 23, for example, as shown by "skeletal small clause 1-P3" or "skeletal small clause 2-P1" in FIG. 28. As shown in FIG. 29, the candidate group sorting unit 37 also sorts the order of the plurality of typical patterns (i.e., candidates) as in the case of the embodiment 2.

Meanwhile, as in the case of the embodiment 1, a result displaying unit 36 may output the plurality of sorted typical patterns in association with the small clause strings, for example, in a format shown in FIG. 29 to a display, a printer, or a storage unit.

Process Performed by Sentence Dividing Apparatus According to Embodiment 3

Figure 30:
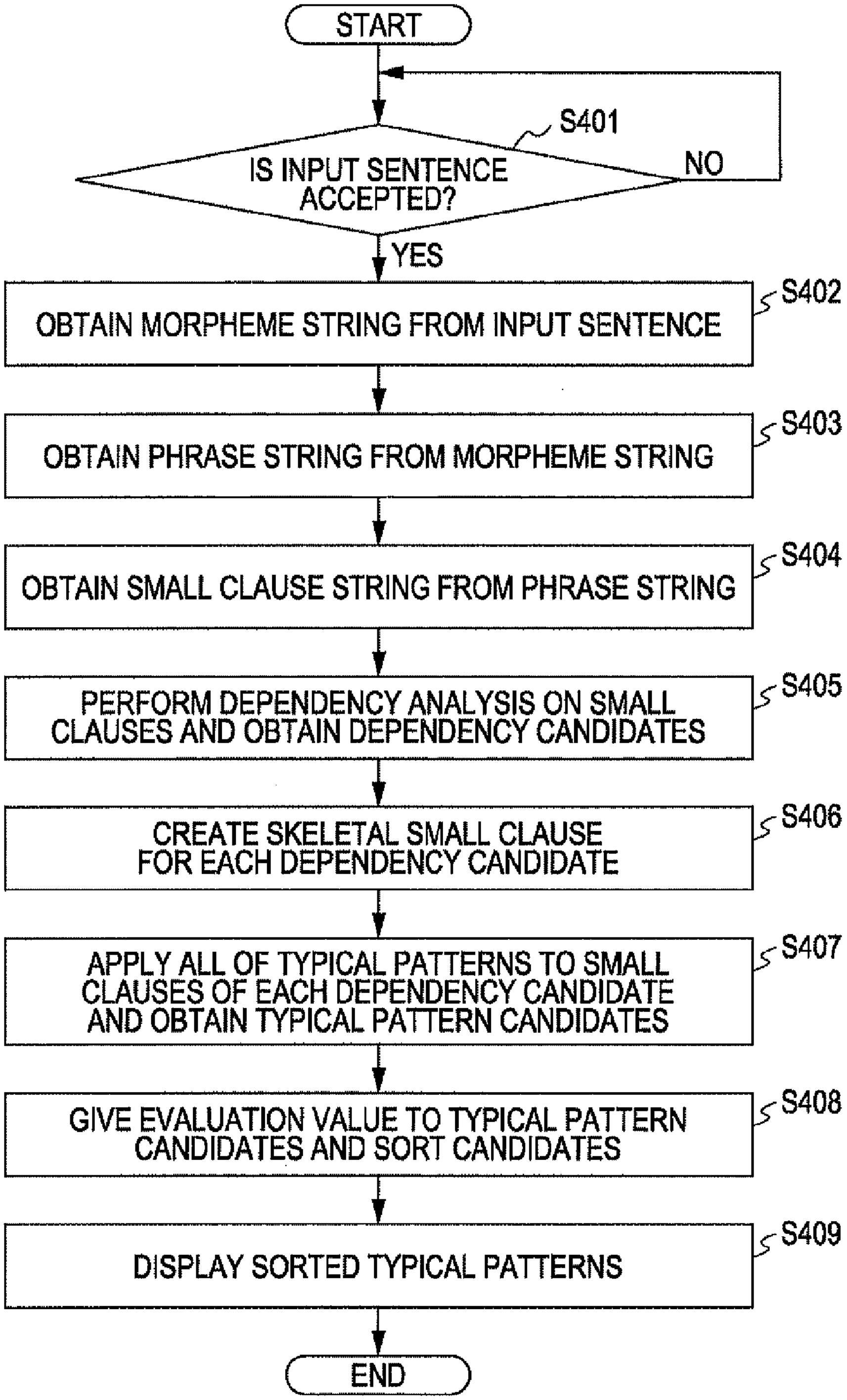
FIG. 30 is a flowchart showing a process performed by a sentence dividing apparatus according to an embodiment 3.

A process performed by the sentence dividing apparatus according to the embodiment 3 will be described next using FIG. 30. FIG. 30 is a flowchart showing a process performed by the sentence dividing apparatus according to the embodiment 3.

Firstly, as in the case of the embodiment 2, the sentence dividing apparatus 10 according to the embodiment 3 determines whether or not an input sentence accepting unit 31 has accepted an input sentence (operation S401). A morpheme analyzing unit 32 then obtains a morpheme string from the input sentence (operation S402). A phrase combining unit 33 then obtains a phrase string from the morpheme string (operation S403).

Subsequently, as in the case of the embodiment 2, the small clause combining unit 34 of the sentence dividing apparatus 10 obtains a small clause string from the phrase string (operation S404). Subsequently, unlike the embodiment 2, the small clause dependency analyzing unit 38 of the sentence dividing apparatus 10 performs dependency analysis on the small clause string to obtain a group of dependency candidates (operation S405). Unlike the embodiment 2, the skeletal small clause creating unit 39 of the sentence dividing apparatus 10 then creates a skeletal small clause string for each of the dependency candidates (operation S406).

As in the case of the embodiment 2, the multiple pattern applying unit 35*a* of the sentence dividing apparatus 10 applies all of typical patterns applicable to the small clause string, and obtains a group of typical pattern candidates. However, unlike the embodiment 2, the multiple pattern applying unit 35*a* applies the typical patterns to the skeletal small clauses (operation S407).

As in the case of the embodiment 2, the candidate group sorting unit 37 of the sentence dividing apparatus 10 gives an evaluation value to each of the typical pattern candidates, and sorts the typical patterns candidates (operation S408). Thereafter, the result displaying unit 36 of the sentence dividing apparatus 10 displays the sorted typical patterns (operation S409).

Advantages of Embodiment 3

As described above, since a small clause string is transformed into a skeletal small clause string including only skeletal small clauses and the created skeletal small clause string is compared with structure patterns, the embodiment 3 allows users to write simple structure patterns even for long sentences.

More specifically, the sentence dividing apparatuses according to the embodiments 1 and 2 writes structure patterns in a unit of small clauses. Thus, particularly when sentences become longer, the number of structure patterns to be written increases and the framework for controlling this is necessary. Accordingly, the sentence dividing apparatus according to the embodiment 3 performs sentence structure analysis in a unit of small clauses, creates a plurality of creatable tree structures, eliminates portions not directly related to an typical expression as "trace" small clauses, thereby being able to dramatically simplify the structure patterns.

That is, the sentence dividing apparatus according to the embodiment 3 integrates processing of structure patterns that allows users to freely write structure patterns of a typical sentence and processing for sentence structure analysis that allows possible tree structures to be created, thereby being able to realize both of broad processing and syntactic processing. More specifically, small clauses in which traditional phrases are connected are used as a minimum unit of sentence structure analysis corresponding to a character of a typical sentence and are treated as the target of the analysis. This simplifies structure patterns written by users and reduces the number of combinations that are structurally possible in the sentence structure analysis, which leads to an improvement in the accuracy of the sentence structure analysis. In addition, the use of the sentence structure information allows the small clauses that are not directly related to a typical expression to be collected, which further simplifies structure patterns and thus the less number of structure patterns is required. In this manner, by preparing a framework for writing simple structure patterns that can be handled even if users does have a knowledge regarding details of a sentence analysis technique, the users can write structure patterns of a sentence.

Embodiment 4

Although the embodiments of the present have been described above, the present invention can be carried out in various difference manners other than the above-described embodiments.

[Program]

Figure 31:
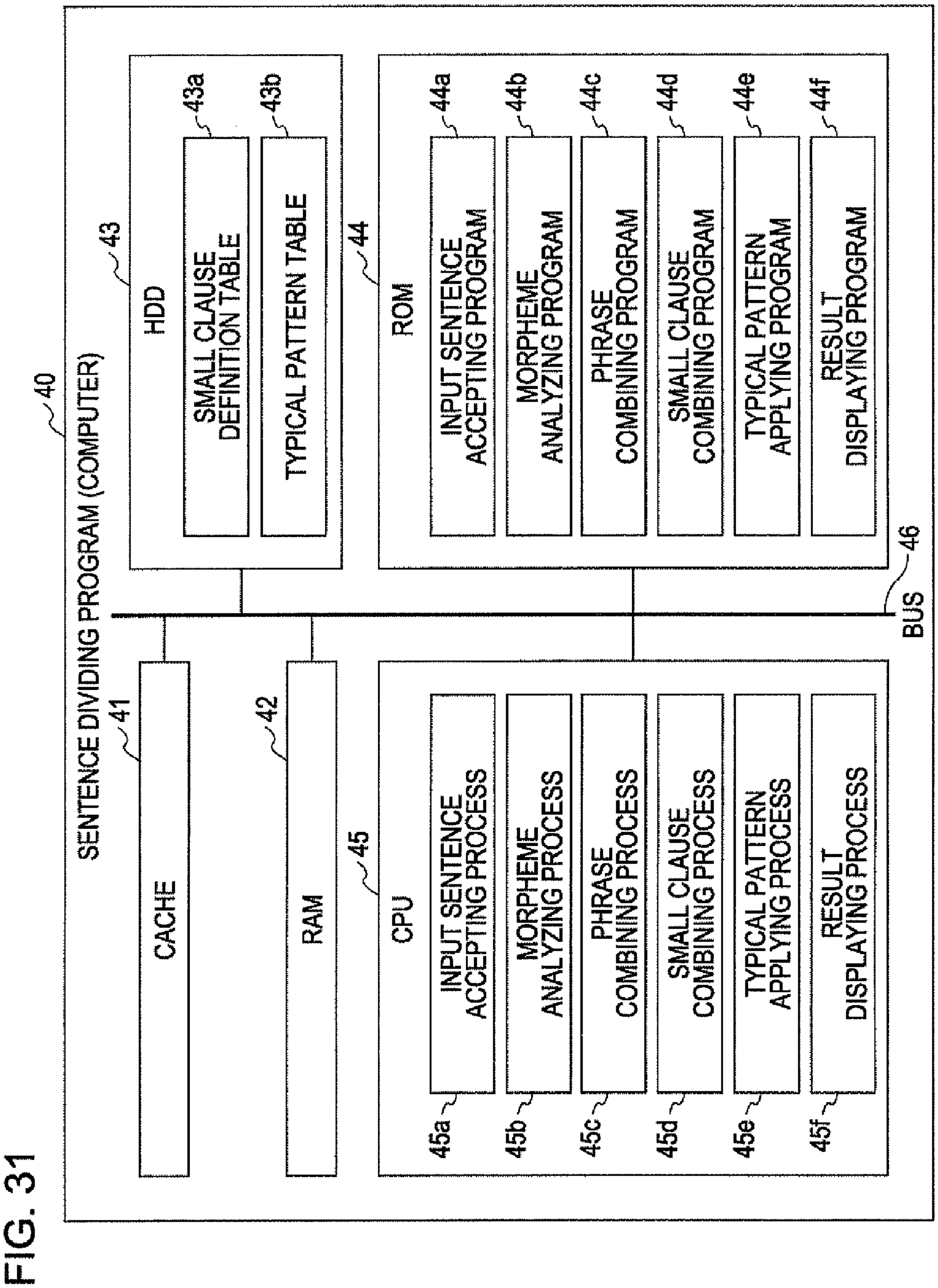
FIG. 31 is a diagram showing a computer that executes a sentence dividing program.

Various kinds of processing having been described in the above-described embodiments can be realized by executing a prepared program by computers, such as personal computers and workstations. Accordingly, an example of a computer that executes a sentence dividing program having a function similar to that offered by the above-described embodiment 1 will be described below using FIG. 31. FIG. 31 is a diagram showing a computer that executes a sentence dividing program.

As shown in FIG. 31, a sentence dividing program (or a computer) 40 includes a cache 41, a RAM (Random Access Memory) 42, an HDD (Hard Disk Drive) 43, ROM (Read-Only Memory) 44, and a CPU (Central Processing Unit) 45, which are connected to each other through a bus 46. The ROM 44 stores a sentence dividing program that demonstrates a function similar to that of the above-described embodiment 1 before hand. More specifically, the ROM 44 stores an input sentence accepting program 44*a*, a morpheme analyzing program 44*b*, a phrase combining program 44*c*, a small clause combining program 44*d*, a typical pattern applying program 44*e*, and a result displaying program 44*f*, as shown in FIG. 31.

The CPU 45 then reads out and executes these programs 44*a* to 44*f*, whereby the programs 44*a* to 44*f* run as an input sentence accepting process 45*a*, a morpheme analyzing process 45*b*, a phrase combining process 45*c*, a small clause combining process 45*d*, a typical pattern applying process 45*e*, and a result displaying process 45*f*, respectively, as shown in FIG. 31. The processes 45*a* to 45*f* correspond to the input sentence accepting unit 31, the morpheme analyzing unit 32, the phrase combining unit 33, the small clause combining unit 34, the typical pattern applying unit 35, and the result displaying unit 36, respectively.

In addition, as shown in FIG. 31, the HDD 43 includes a small clause definition table 43*a* and a typical pattern table 43*b*. The tables 43*a* and 43*b* correspond to the small clause definition storage unit 21 and the typical pattern storage unit 22 shown in FIG. 2, respectively.

Meanwhile, the above-described programs 44*a* to 44*f* do not have to be stored in the ROM 44. The programs 44*a* to 44*f* may be stored on, for example, "portable physical media" such as a flexible disk (FD), a CD-ROM (Compact Disc-Read Only Memory), an MO (Magneto-optical) disk, a DVD (Digital Versatile Disk), and an IC (Integrated Circuit) card that can be inserted into the computer 40, "fixed physical media" such as an HDD (Hard Disk Drive) internally or externally included in the computer 40, and "other computers (or servers)" connected to the computer 40 through a public line, the Internet, a LAN (Local Area Network), and a WAN (Wide Area Network), and the computer 40 may read out and execute these programs.

[System Configuration]

Although a configuration that includes a storage unit storing small clause definitions and a storage unit previously storing typical patterns in an identical apparatus before hand, including a controlling section for performing sentence dividing processing has been described in the embodiment 1 to 3, the present invention is not limited to this particular configuration. The present invention can be similarly applied to a configuration where a storage unit storing small clause definitions before hand, and a storage unit storing typical patterns before hand are included in an apparatus different from an apparatus including a controlling section for performing sentence dividing processing or a configuration where the small clause definitions and the typical patterns stored in these storage units are stored on portable storage media.

Additionally, a method for allowing the sentence dividing apparatus to apply each of typical patterns to a skeletal small clause string, to calculate evaluation values, and to sort the division results has been described in the embodiment 3. The present invention can be similarly applied to a method for allowing the sentence dividing apparatus to apply the typical patterns on the skeletal small clause string and finishes the processing if a matching typical pattern is found (i.e., method in which the calculation of evaluation values and the sorting are not performed).

Additionally, all of or some of processing operations having been described to be executed automatically among those described in the embodiments can be executed manually. Additionally, all of or some of processing operations having been described to be executed manually can be executed automatically according to known methods. In addition, procedures shown herein and in the drawings (FIGS. 10, 20, and 30), control procedures, specific names, information including various kinds of data and parameters can be freely changed unless otherwise noted.

In addition, each element of apparatuses shown in the drawings is functional and conceptual, and the apparatuses do not have to be physically configured as shown in the drawings (FIGS. 2, 11, and 21). That is, specific configurations regarding distribution and integration of each apparatus is not limited to the ones shown in the drawings, and all of or some of configurations can be functionally or physically distributed or integrated in a given unit according to the various kinds of load and the status of use (e.g., a configuration for integrating the small clause definition storage unit and the typical pattern storage unit). Furthermore, all of or some of processing functions performed in each apparatus can be realized by the CPU, by a program that is analyzed and executed by the CPU, or by a hardware employing the wired logic.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable medium having a sentence dividing program stored thereon and a processor, the program causing the processor to execute:

receiving a typical sentence from a user via an input device;

dividing, using the processor, under a circumstance where positions suitable for dividing the typical sentence based on the structure are expressed by a user using property information of the sentence and are previously stored as a small clause definition in a first storage unit, a division target typical sentence on the basis of the small clause definition stored in the first storage unit, and of creating a small clause string including small clauses that serve as independent sentences after the division, the small clause string comprising two or more words;

analyzing, regarding the small clause string, dependency between the small clauses constituting the small clause string;

eliminating, according to a result of the analysis, a small clause that modifies a skeletal small clause that serves as a skeleton in the structure of the typical sentence to transform the small clause string into a skeletal small clause string including only skeletal small clauses;

comparing, using the processor, under a circumstance where structures suitable for the typical sentence are expressed by the user as combinations with each small clause definition and are previously stored as structure patterns in a second storage unit, the skeletal small clause string with the structure patterns stored in the second storage unit; and selecting, using the processor, as a division result of the typical sentence, a structure pattern that is determined to match the skeletal small clause string, wherein the comparing includes comparing the skeletal small clause string with the structure patterns, wherein if a number of small clauses that link to a pointer-set small clause is one, a next small clause on the left is selected, and wherein if the number of small clauses that link to the pointer-set small clause is not one, the next small clause on the left and small clauses that link to the small clause on the left is replaced with a trace.

2. The non-transitory computer-readable medium having the sentence dividing program stored thereon according to claim 1, further comprising:

evaluating, when a plurality of structure patterns are determined to match the small clause string, a degree of matching of the small clause string and each of the plurality of structure patterns; and sorting, according to a result of the evaluation, the order of the plurality of structure patterns that are determined to match the small clause string.

3. A sentence dividing apparatus for dividing a typical sentence having a specific typical characteristic in a structure of the sentence, the apparatus comprising:

a memory; and a processor coupled to the memory and configured to divide the typical sentence by:

receiving the typical sentence from a user via an input device;

previously storing a small clause definition in the memory, in which positions suitable for dividing the typical sentence based on the structure are expressed by a user using property information of the sentence;

previously storing structure patterns in the memory, in which structures suitable for the typical sentence are expressed as combinations with each small clause definition;

dividing a division target typical sentence on the basis of the small clause definition stored in the memory, and creating a small clause string including small clauses that serve as independent sentences after the division, the small clause string comprising two or more words;

analyzing, regarding the small clause string, dependency between the small clauses constituting the small clause string;

eliminating, according to a result of the analysis, a small clause that modifies a skeletal small clause that serves as a skeleton in the structure of the typical sentence to transform the small clause string into a skeletal small clause string including only skeletal small clauses;

comparing the skeletal small clause string with the structure patterns stored in the memory; and selecting, as a division result of the typical sentence, a structure pattern that is determined to match the skeletal small clause string, wherein the comparing includes comparing the skeletal small clause string with the structure patterns, wherein if a number of small clauses that link to a pointer-set small clause is one, a next small clause on the left is selected, and wherein if the number of small clauses that link to the pointer-set small clause is not one, the next small clause on the left and small clauses that link to the small clause on the left is replaced with a trace.

4. A sentence dividing method for dividing a typical sentence having a specific typical characteristic in a structure of the sentence, the method comprising:

receiving the typical sentence from a user via an input device;

dividing, using a processor, under a circumstance where positions suitable for dividing the typical sentence based on the structure are expressed by a user using property information of the sentence and are previously stored as a small clause definition in a first storage unit, a division target typical sentence on the basis of the small clause definition stored in the first storage unit, and of creating a small clause string including small clauses that serve as independent sentences after the division, the small clause string comprising two or more words;

analyzing, regarding the small clause string, dependency between the small clauses constituting the small clause string;

eliminating, according to a result of the analysis, a small clause that modifies a skeletal small clause that serves as a skeleton in the structure of the typical sentence to transform the small clause string into a skeletal small clause string including only skeletal small clauses;

comparing, using the processor, under a circumstance where structures suitable for the typical sentence are expressed by the user as combinations with each small clause definition and are previously stored as structure patterns in a second storage unit, the skeletal small clause string with the structure patterns stored in the second storage unit; and selecting, using the processor, as a division result of the typical sentence, a structure pattern that is determined to match the skeletal small clause string, wherein the comparing includes comparing the skeletal small clause string with the structure patterns, wherein if a number of small clauses that link to a pointer-set small clause is one, a next small clause on the left is selected, and wherein if the number of small clauses that link to the pointer-set small clause is not one, the next small clause on the left and small clauses that link to the small clause on the left is replaced with a trace.

* * * * *